United States Patent
Hu

(10) Patent No.: US 10,939,025 B2
(45) Date of Patent: Mar. 2, 2021

(54) PROTECTION AND SKIN DAMAGE DETECTION DEVICES AND SYSTEM

(71) Applicant: HallStar Beauty and Personal Care Innovations Company, Chicago, IL (US)

(72) Inventor: Shengkui Hu, Darien, IL (US)

(73) Assignee: HallStar Beauty and Personal Care Innovations Company, Chicago, IL (US)

( * ) Notice: Subject to any disclaimer, the term of this patent is extended or adjusted under 35 U.S.C. 154(b) by 0 days.

(21) Appl. No.: 16/595,295

(22) Filed: Oct. 7, 2019

(65) Prior Publication Data

US 2020/0112659 A1 Apr. 9, 2020

Related U.S. Application Data

(63) Continuation-in-part of application No. 16/206,325, filed on Nov. 30, 2018.
(Continued)

(51) Int. Cl.
*H04N 5/225* (2006.01)
*G06T 7/70* (2017.01)
(Continued)

(52) U.S. Cl.
CPC .......... *H04N 5/2256* (2013.01); *G01J 1/429* (2013.01); *G01J 1/44* (2013.01); *G06T 7/70* (2017.01);
(Continued)

(58) Field of Classification Search
CPC ................................ G06T 7/70; H04N 5/2256
See application file for complete search history.

(56) References Cited

U.S. PATENT DOCUMENTS

2013/0300850 A1* 11/2013 Millikan .............. A61B 5/0077
348/77
2015/0102208 A1* 4/2015 Appelboom .......... G01J 1/4204
250/208.2
(Continued)

FOREIGN PATENT DOCUMENTS

KR 20170037026 A 4/2017
WO 2010093503 A2 8/2010
(Continued)

OTHER PUBLICATIONS

International Search Report and Written Opinion dated Jan. 28, 2020 in connection with International Application No. PCT/US2019/055053, 12 pages.

*Primary Examiner* — Clayton E. LaBalle
*Assistant Examiner* — Dennis Hancock
(74) *Attorney, Agent, or Firm* — Baker & McKenzie LLP

(57) ABSTRACT

This disclosure is directed to devices, systems, and methods for skin damage protection and detection, including providing images and recommendations and images to users to assist them with proper application of an applied-to-skin sunscreen. Disclosed devices include personal user devices that are operable to emit ultraviolet light and to measure the degree of ultraviolet light reflected from skin, upon which images can be presented on a device screen to give visual indications of sunscreen coverage and/or skin aging. Measured ultraviolet images and visible light images can further be presented to device users in an overlay, side-by-side, or other fashion, to further assist in detection of sunscreen coverage and/or degrees of skin damage. Further, the user of the device may be able to view real-time video in the same ultraviolet/visible light overlay fashion, and assess the state of photo-protective effects of an applied-to-skin sunscreen.

16 Claims, 8 Drawing Sheets

Related U.S. Application Data

(60) Provisional application No. 62/742,825, filed on Oct. 8, 2018, provisional application No. 62/893,015, filed on Aug. 28, 2019.

(51) Int. Cl.
  *G01J 1/42* (2006.01)
  *G01J 1/44* (2006.01)
  *H04N 5/232* (2006.01)

(52) U.S. Cl.
  CPC ............... *H04N 5/23293* (2013.01); *G06T 2207/30196* (2013.01)

(56) References Cited

U.S. PATENT DOCUMENTS

| | | | |
|---|---|---|---|
| 2015/0313532 A1* | 11/2015 | Marinkovich | G06F 19/00 600/306 |
| 2017/0069192 A1* | 3/2017 | Sood | G01J 1/0219 |
| 2017/0249436 A1* | 8/2017 | Miller | G06F 19/326 |
| 2018/0120151 A1* | 5/2018 | Feldman | G01J 1/0219 |
| 2018/0202927 A1 | 7/2018 | Isikman et al. | |
| 2019/0125249 A1* | 5/2019 | Rattner | A61B 5/6898 |
| 2019/0204146 A1* | 7/2019 | Wei | A61B 5/7275 |
| 2019/0346306 A1* | 11/2019 | Jeong | G02F 1/15 |

FOREIGN PATENT DOCUMENTS

| | | |
|---|---|---|
| WO | 2017146782 A1 | 8/2017 |
| WO | 2017181293 A1 | 10/2017 |

\* cited by examiner

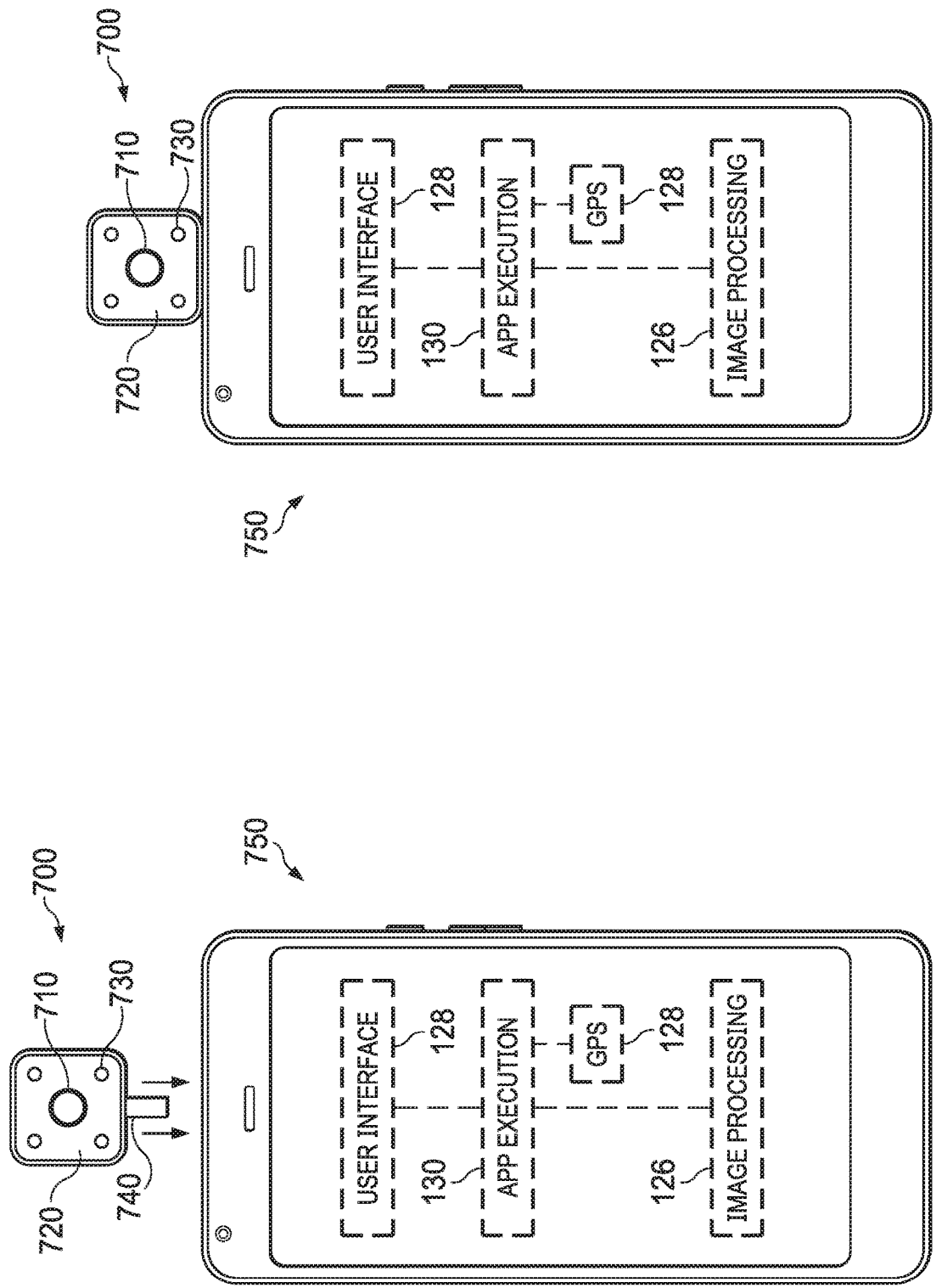

PROTECTION AND SKIN DAMAGE DETECTION DEVICES AND SYSTEM

CROSS-REFERENCE TO RELATED APPLICATIONS

This application is a continuation-in-part of U.S. application Ser. No. 16/206,325 filed on Nov. 30, 2018, which claims priority to and is a non-provisional of U.S. Provisional Application No. 62/742,825 filed on Oct. 8, 2018, the contents of all of which are hereby expressly incorporated by reference in their entirety, including the contents and teachings of any references contained therein. This application claims priority to and is a non-provisional of U.S. Application No. 62/742,825 filed on Oct. 8, 2018. This application also claims priority to and is a non-provisional of U.S. Provisional Application No. 62/893,015 filed on Aug. 28, 2019, the contents of which is hereby expressly incorporated by reference in its entirety, including the contents and teachings of any references contained therein.

TECHNICAL FIELD

The present disclosure relates, according to some embodiments, to protection and skin damage detection devices and system for determining skin damage from ultraviolet (UV) radiation, skin exposure to UV radiation, and determining the state of photo-protective effects from an applied-to-skin sunscreen.

BACKGROUND

Young and healthy-looking skin is a feature that is universally admired. However, as we age, skin condition deteriorates due to a variety of intrinsic and extrinsic factors determined not only by genetics and physiological health but also by behavior and lifestyle choice. Skin aging is defined by the normal process of chronological aging, superimposed by the process of so-called "extrinsic" aging, which can be exacerbated and/or mediated by a variety of exogenous factors. While the former is a universal human constant, the latter is determined largely by behavior and lifestyle choice. There is overwhelming evidence that ultraviolet radiation (UV; $\lambda$=280-400 nm) in sunlight is associated with a multitude of deleterious dermatological events. Exposure of unprotected skin to solar radiation causes numerous physiological effects, the most obvious of which are sunburn and skin darkening. Chronic effects from repeated exposure to solar radiation include specific types of skin cancer and a myriad of degenerative events responsible for most of the visible signs of skin aging.

There is consensus among the scientific and medical communities that chronic exposure to UV radiation in ordinary sunlight is a major factor causing the undesirable changes in the appearance of skin. Indeed, as simple within-subject evidence of the phenomenon of photo-aging, one need only compare and contrast those areas of the body that receive a relatively low lifetime dose of solar radiation (e.g., skin on the buttock or volar forearm) to those receiving a corresponding higher dose (e.g., skin on the face, neck or dorsal forearm).

The undesirable skin changes associated with photo-damage include: dryness, roughness, actinic keratosis, irregular pigmentation (freckling/lentigines), wrinkling, elastosis, loss of elasticity, dilated/tortuous blood vessels (telangiectasia), blackheads (solar comedones) and sebaceous hyperplasia. While acknowledging the causes and consequences of photo-aging to some degree, consumers are only presented with the ugly results of photo-aging after the symptoms present themselves. Unfortunately, once created, the consequences of photo-aging are difficult (if not impossible) to correct. It is much better to deal with this situation proactively. Therefore, tools and methods are needed for consumers to be able to take the proactive approach. At least three conditions are needed for proactive prevention of photo-aging to become possible: (1) a simple and easily accessible method to detect photo-aging before it becomes visible to human eyes; (2) effective and pleasant cosmetic products focused on preventing photo-aging; and (3) a simple and easily accessible way to display the effectiveness of the cosmetic product in real time.

One of the simplest ways to protect human skin from photo-aging is to apply correct sunscreen products and ensure the efficacy of the applied sunscreen on human skin. However, the effectiveness of sunscreen is not clearly conveyed to the consumers. The commonly used sun protection factor (SPF) number and PA plus number on the sunscreen labels are neither scientific nor straight forward. These numbers are not directly correlated with the percentage of UV radiation prevented. Furthermore, the quality of the protection achieved by a sunscreen is dependent on the thickness, uniformity, and persistence of the sunscreen agents on the skin, which cannot be easily displayed at this time.

SUMMARY

Unfortunately, once created, the consequences of photo-aging are difficult (if not impossible) to correct. It is much better to deal with this situation proactively. Therefore, tools and methods are needed for consumers to be able to take the proactive approach. At least three conditions are needed for proactive prevention of photo-aging to become possible: (1) a simple and easily accessible method to detect photo-aging before it becomes visible to human eyes; (2) effective and pleasant cosmetic products focused on preventing photo-aging; and (3) a simple and easily accessible way to display the effectiveness of the cosmetic product in real time. There is so far no straight-forward method for consumers to view the quality of sunscreen on human skin because sunscreen agents are invisible to human eyes. Disclosed herein are methods for visualizing both the application of sunscreen to skin and the photo-aging of skin before it is apparent to a general human eye. The protection and skin damage detection devices and system described herein permit photo-aging and on-skin sunscreen quality to be visible to human eyes and to additionally visualize photo-aging before it is apparent to human skin. Further, the disclosed detection devices and system may determine the state of photo-protective effects from an applied-to-skin sunscreen.

This disclosure is directed to a device, a system, and a method of determining sunblock coverage and damage from ultraviolet radiation. The device comprises a light-emitting component, operable to emit light in the ultraviolet wavelength range, a light input which is operable to receive light incident on the device and to transmit the light, an optical filter which is operable to receive the light transmitted by the light input and to filter the transmitted light by wavelength, a sensor which is operable to receive at least a portion of the filtered light received from the optical filter and to generate signals corresponding to the received filtered light, and a processor which is operably connected to the light-emitting component and the sensor and is configurable to control the light-emitting component, receive the signals from the sensor indicative of the received filtered light, construct a first image derived at least in part from the signals from the sensor, construct a second image derived at least in part from the signals from the sensor, and generate display signals which are operable to be received by a visual display which may present both the first image and the second image.

In some embodiments, as described in the present specification, a first image is derived at least in part by a sensor receiving light in the ultraviolet wavelength range. In some embodiments, a second image is derived at least in part by a sensor receiving light in a visible wavelength range. In some embodiments, a sensor is operable to receive light in both visible and ultraviolet wavelength ranges and it generates separate signals indicative of received light in both of those ranges. In some embodiments, the sensor includes a first subsensor and a second subsensor, the first subsensor being operable to generate signals indicative of received filtered light in the ultraviolet wavelength range and the second subsensor being operable to generate signals indicative of received filtered light in the visible wavelength range.

Also, as further described in the present disclosure, in some embodiments, the first image is derived at least in part from generated signals from the first subsensor indicative of received filtered light in the ultraviolet wavelength range. In some embodiments, the second image is derived at least in part from generated signals from the second sub sensor indicative of received filtered light in the visible wavelength range. In further disclosed embodiments, a processor is configurable to generate a display signal, operable to be received by a visual display. Thus, the visual display may present both the first image and the second image in an overlay, side-by-side, or other fashion. The first image and the second image may be still or motion-video images.

Disclosed systems for determining sunblock coverage and damage from ultraviolet radiation described in the present specification comprise one or more servers, each of which may have associated program memories comprising server instructions. The systems also include processing devices operable for executing the server instructions that the processing devices receive images, perform analyses of the images to determine the level of absorption of electromagnetic radiation at a specified portion of the images, and generate results based on the analysis of the received images. As described above, the received images can be still or motion-video images. The generated results can be, in some embodiments, indicative of skin damage and, in at least some embodiments, the processing device is further operable to store the results in databases for later analyses and historical comparisons.

The stored results can further be associated with a user profile and, in some embodiments, the processing devices are further operable to perform the operations of retrieving at least one stored result associated with the user profile from the one or more databases associated with the one or more servers, comparing the at least one stored result to the result generated from the received image, and generating a comparison result from the comparison.

In some embodiments, images are received from user devices, and the user devices may be further operable to emit light in an ultraviolet wavelength range, receive light incident on the device and transmit the light, filter the transmitted light by wavelength, generate signals corresponding to the filtered light, construct an image derived at least in part from the generated signals, and transmit the image to the one or more servers, another application, or web destination.

Methods described in the present specification are for determining sunblock coverage and damage from ultraviolet radiation comprises emitting ultraviolet radiation from a light-emitting component, receiving incident light at a light input and transmitting the received light, filtering the transmitted light by wavelength, receiving at least a portion of the filtered light at a sensor and generating signals corresponding to the received light, constructing a first image derived at least in part from the signals from the sensor, constructing a second image derived at least in part from the signals from the sensor, and generating display signals, operable to be received by a visual display, whereby the visual display may present both the first image and the second image. The disclosed methods are also disclosed in connection with the functionality described in this specification in connection with the disclosed devices and methods.

BRIEF DESCRIPTION OF THE DRAWINGS

FIG. 8A shows a user device positioned next to a personal electronic device; and FIG. 8B shows the user device from FIG. 8A connected to the personal electronic device from FIG. 8A.

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION OF THE EMBODIMENTS

In the following detailed description, numerous specific details are set forth by way of examples in order to provide a thorough understanding of the relevant teachings. However, the present teachings may be practiced with or without such specific details. In other instances, well-known methods, procedures, components, and/or circuitry have been described at a relatively high level, without detail, in order to avoid unnecessarily obscuring aspects of the present teachings. The various technologies described in this specification generally relate to imaging, and more specifically relate to methods and systems for imaging in the ultraviolet (UV) spectrum and utilizing images over fixed and packet networks using disclosed user devices, such as personal computers and mobile devices. Specifically, this disclosure is directed to apparatuses including user devices for capturing images in both the UV and visible light spectrums and manipulation of those images and the data contained therein to provide information across networks. The disclosed apparatuses include computing device processors for capturing, manipulating, and analyzing images in the UV spectrum. Further, the disclosed apparatuses may include circuits and other system elements for communicating with a server, and disclosed user devices may transmit information about images for determining sunblock coverage and/or damage from ultraviolet radiation.

Figure 1:
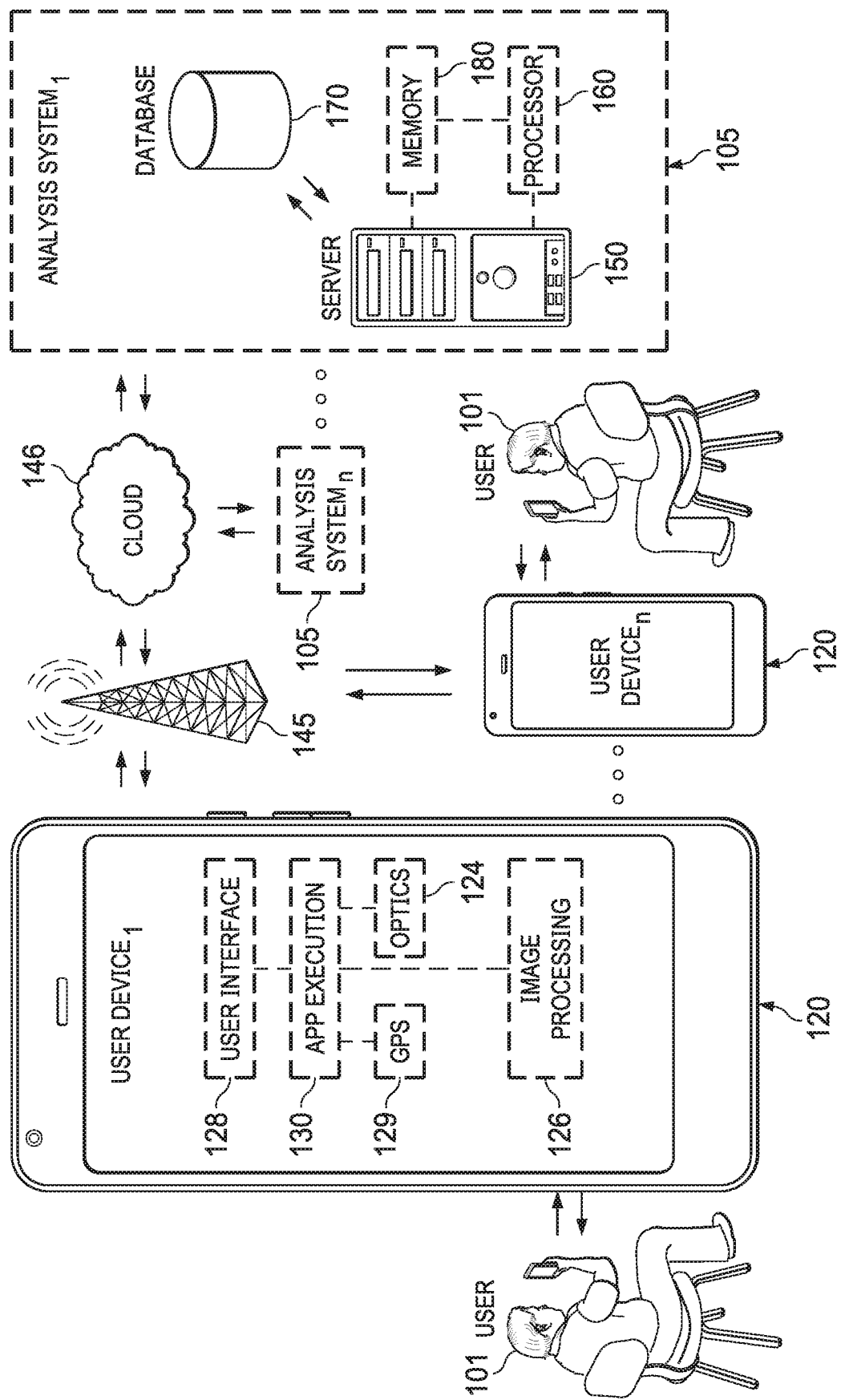
FIG. 1 shows a schematic block diagram of a system for determining sunblock coverage and damage from ultraviolet radiation in accordance with disclosed embodiments.

FIG. 1 describes a schematic block diagram of an operating system for determining sunblock coverage and/or damage from ultraviolet radiation 100. The system 100 of FIG. 1 provides for a user device 120 having a combination UV and visible optics subsystem 124 that captures and provides optical processing of UV and visible light images of subjects (including the user 101) to (a) determine if the subjects have sufficient sunscreen or sunblock coverage after application and/or after subsequent activity, such as 1, 2, 3, 4, or more hours later after the initial application of the sunscreen or sunblock, and (b) provide UV and/or visible light images to that may be used to analyze the subjects' degree of chronological and/or extrinsic aging from exogenous factors such as UV exposure, particularly including UV exposure from sunlight. The user device 120 further may comprise an image processing subsystem 126 for processing the images received and initially processed by the UV and visible optics subsystem 124. By the image capture and analysis, a user 101 of the user device 120 can interact through a user interface 128, which may suggest preventative or curative measures relative to exposure to UV light, such as applying more sunblock or sunscreen or application of cosmetics or other treatments to mitigate the effects of extrinsic aging.

The system further provides for further processing of the UV and visible images through transmission of those images though a wireless network 145, such as the case when the user device 120 is a personal electronics device such as a cell phone, tablet, wirelessly connected personal computer, Internet of Things (IoT) device, or in other instances they images could be transferred through a wired network (not shown). The illustrated cloud network 146, such as the internet, can be used to further transmit the captured image to one or more servers 150 for further processing, and the servers 150 may provide for further user engagement such as to receive further or more detailed suggestions with regard to the above-mentioned preventative or curative measures, and/or to provide location-specific advice based on location and the time of day, which would be further facilitated by a Global Positioning System (GPS) or other location subsystem 129 and using time-of-day technology (not shown) that is also included within the user device 120.

According to some embodiments, a user 101 interacts with the disclosed systems 100 for determining sunblock or sunscreen coverage and/or skin damage from ultraviolet radiation or other extrinsic factors. Disclosed user devices 120 may include computing device capable of sending data and communicating over the internet with one or more servers 150, other user devices 120, or other type of computing devices. For example, servers 150 may analyze transmitted images and other environmental factors from the user devices 120 to provide contextualized suggestions to users based upon those images and other factors. For example, there are certain areas where reflected light from water or snow cover would raise the risk of UV exposure, so a greater coverage could be recommended in this context based upon detected location, weather information (cloud cover), time of day, season of the year, etc. Ambient UV levels could even be detected and processed by multiple devices in order to provide an average detected UV level in a region, and that information could be used to provide real-time adaptive suggestions for sunscreen and sunblock coverage. These suggestions may be based on information provided by or generated directly at a user device, remote server(s), any number of IoT devices, sensors, and/or other source such as artificial intelligence or collective intelligence based on neighboring devices or historical data, etc. Suggestions may be based on information from the National Weather Service, e.g. cloud cover, snow cover, etc., retrieved from a server or from another service or application. Further, suggestions may be based on GPS data such as specific location, surrounding geography (e.g. map data including lakes, oceans, or other bodies of water), etc., which may be retrieved or generated at a user device, from a server, or from a service or application such as Google Maps. In some embodiments, suggestions may be based on information about ambient light conditions, altitude, or other factors which may be measured by a user device.

A wireless communications network 145 may be a 3G network, 4G, LTE, 5G, Wi-Fi, Bluetooth, or any other network protocol and may be a combination of any number of networks. Further, as mentioned above a wired network connection such as a conventional Ethernet connection could be used, such as with a personal computer with an Ethernet port. User devices 120 may include processors 430 (see FIGS. 4A-4B) such as digital signal processors or a microprocessors for performing the different methods described in this specification. Further details regarding embodiments of the architectures of the user devices 120 are further described in this specification, particularly with regard to FIGS. 4A-4B.

Also, user profiles and histories of images, analyses, and trends of sunscreen coverage and recommendations can be processed and stored in servers 150 and their associated memories 180 or databases 170. By providing servers 150 communicating with multiple user devices 120, the servers and an overall analysis system 105 can be provided that can provide more accurate and/or detailed suggestions based upon data and other environmental conditions and effects (such as measured UV ambient information) from multiple user devices 120. Further provided within the overall analysis system 105, app servers 185 may be provided for interaction with the user through apps developed in the context of the present disclosure for a user's use on their personal computing devices 120 (such as a cell phone, tablet, or back-end web apps) and/or web servers 190 may be provided by which a user 101 could login to their account to access their historical data and suggestions through a traditional client/server interface or other direct interface with a user device.

Further to the above-described recommendations, the disclosed system is able to provide product/regimen/usage recommendations based upon one or more of the following parameters: measured percentage of coverage of product on a defined skin area; measured quality of coverage of product on a defined skin area; quality of protection of product on a defined skin area; characteristics of the product such as protection efficiency, coverage effectiveness, and its sensorial feedback from the user; repeated application of this product and results measurements, based upon historical usage data and/or machine learning and prediction based on these data. Thus, the system can provide these recommendations based upon the above-described processing of the UV and visible images as sent though the wireless network 145 from the user device 120 to one or more system servers 150. The servers 150 in turn provide these recommendations to users through the user device 120.

The above measurements can not only be determined in real-time, but they can also be developed based upon historically measured data by the user or federated data from groups of users. The measured and processed data stored, accessed, and processed by the above-described servers include data that could be analyzed collectively for providing data, and that data could be accessed such as through an Application Programming Interface ("API") to the servers that could be accessed by other applications, user devices, or third-party servers. Such federated or collective data that could be of use include the following: users' habits in applying certain products; product usage time, date, location; coverage effectiveness as related to user skin information such as skin tone, skin nature wet/dry, skin topology, and user age and gender in accordance with permissible uses in a given market.

The above information can be used to provide individualized product recommendations to a user 101 based upon their determined profile as associated with data gathered through their usage of their personal device 120 and other user-reported data. Further, the collective information processed, historically collected, and accordingly accessible to the servers 150 can be used to provide even improved personal recommendations. Further, the above information can be used to design personalized products based on any of this data. For instance, a particular user's personalized product might have a higher or lower moisturizer content, or a greater or lesser SPF character, or a greater or lower durability characteristics depending upon processing of historical, individual collected data or based upon collective information that can be intelligently applied to an individual user based upon common characteristics of the user's skin or the user's environment and those aspects similarities with data gathered for collective groups of users with similar skin, environments, or both.

Further disclosed in the present application are cosmetic chemistries and methods to facilitate use of the disclosed systems and methods for using these disclosed systems and methods with products that have been specially designed to work with the disclosed systems and methods. For example, the disclosed cosmetic chemistries and methods include using "tagged" products having molecules that enable or enhance visibility of any "tagged" product present under UV illumination and imaging, whether or not such products have UV-protective characteristics. Ideally, such "tagged" products would have an effective UV absorption ability at the desired wavelength: strong UV absorption ability with no or limited visible light absorbance. Such UV characteristics are developed to be stable to heat and light and suitable for cosmetic uses, the chemistries would be non-migratory in nature. In disclosed embodiments, the structures include those with high molar extinction coefficient such as a greater than 40,000 mole-1·cm-1 at 350-400 nm. As further examples, a disclosed structure may have a molar extinction coefficient of greater than about 10,000 mole-1·cm-1, or greater than about 20,000 mole-1·cm-1, or greater than about 40,000 mole-1·cm-1, or greater than about 60,000 mole-1·cm-1, or greater than about 80,000 mole-1·cm-1, at 350-400 nm, where about includes plus or minus 5,000 mole-1·cm-1. In particular, the above-described molar extinction coefficients have been selected to enable or optimize detection of product using UV illumination and detection capabilities as described with the UV illumination and UV imaging characteristics of the systems and method described herein.

Although the servers 150 illustrated in the present figure are illustrated as stand-alone computing machines, the computing functionality, including servers 150, processors or processor instances 160, memory or computing data storage areas 180, and databases 170 can be provided through a cloud implementation such as Amazon Web Services or by a hybrid enterprise/cloud architecture. It is understood that the terms system, apparatus, device, etc. may be used interchangeably in this specification. In some embodiments, a method is provided for performing the various steps performed by any computing device, e.g. user device 120, described herein. In some embodiments, a non-transitory computer-readable medium comprising code is provided for causing any user device 120, computing device, or server 150, to perform the various methods described herein. The scope of any claims that may be a part of this application or any application stemming from the present application shall be determined by those claims as read in light of the claims, but the elements of the particularly illustrated embodiments shall not be imputed to the claim language unless particularly invoked through the use of means-plus-function language under 35 U.S.C. Section 112(f).

Figure 2:
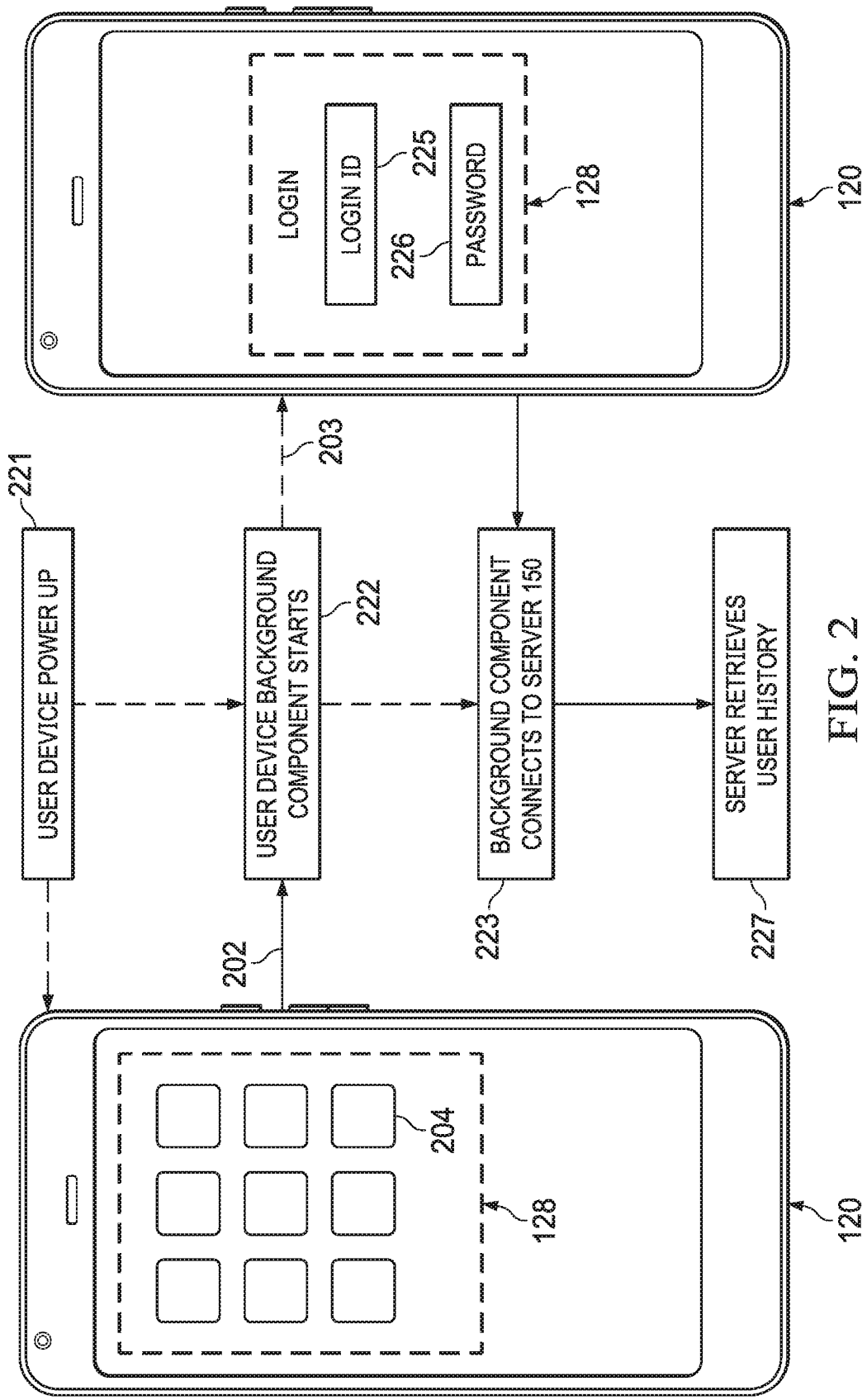
FIG. 2 shows a flowchart that schematically represents a method for determining sunblock coverage and/or damage from ultraviolet radiation in accordance with disclosed embodiments.

FIG. 2 illustrates a flowchart that schematically represents a method for initiating a session for determining sunblock coverage and/or damage from ultraviolet radiation at a user device 120 by background and foreground components. According to some embodiments, the process begins at power up 221 upon which, at activity 222, a user device background component may be loaded into the app execution system 130 and may start execution. The user device background component may connect 223 to a server over the IP layer provided by any available data channel of the underlying wireless network 145 or other network. A server 150 may require that a user device 120 possess the appropriate credentials on the system in order to initiate a connection 223 with the background component.

Figure 3:
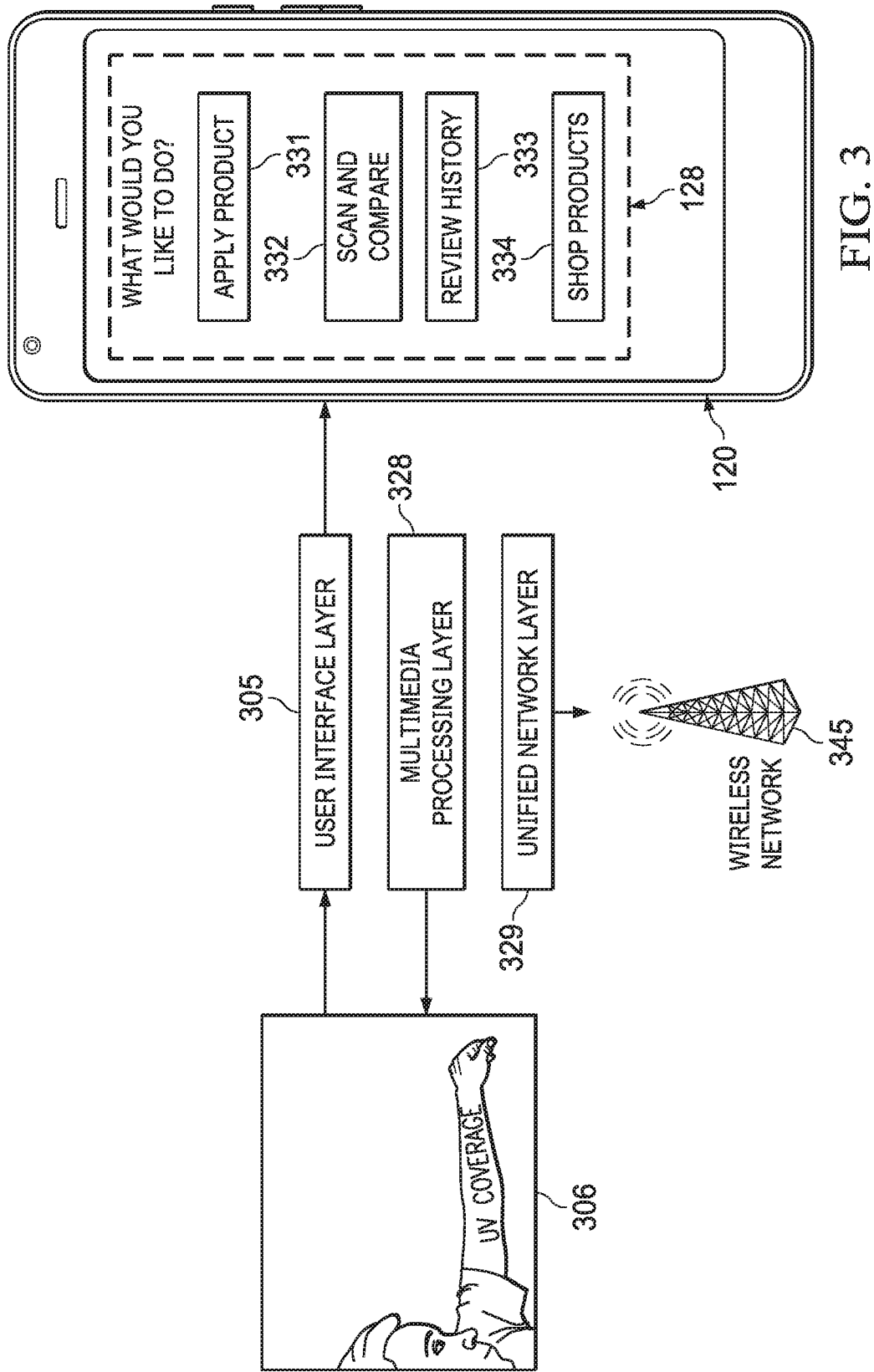
FIG. 3 shows the different functional layers associated with a disclosed embodiment of a user device.

A user device 120 may include different schematic layers, e.g. a user device hardware layer, one or more device drivers, an operating system, a UV imaging and image analysis background component, and a UV imaging and image analysis foreground component. Referring now to FIG. 3, a user device 120 may further include any combination of a user interface layer 305, a multimedia processing layer 328, and a unified network layer 329. The user interface layer 305 may handle interaction with users and may allow a user to control the operation of a program. Additionally, the user interface layer 305 may render on the user device 120 any received audio or visual signals from the server. The multimedia processing layer 328 manages the capturing and encoding of audio and visual signals 306 from the user device 120 hardware, as well as the decoding and rendering of audio and visual signals received from the server. The unified network layer 329 handles the packaging and transmission of encoded audio and visual data, together with necessary auxiliary information, down to an abstract interface representing the underlining data network connections. The unified network layer 329 manages communications with wireless networks 345 and collects relevant data packets received and presents the data up to the multimedia processing layer 328 as a single logical network interface.

Although various system elements such as the ones described in FIG. 1 (but also those described in various other hardware figures of the present application) can provide the functionality of the layers described with respect to FIG. 3, in an exemplary approach, the functionality of the user interface layer 305 are generally provided by the application execution subsystem 130 in communication with the user interface 128, such that the commands and graphics provided in the user interface 128 would be provided by the application execution subsystem 130. Further, the functions of the media processing layer, and particularly functions relating to the processing of incoming images are generally provided by the UV and visible options subsystem, the image processing subsystem, and elements of the processor 160 within the overall analysis system 105 in communication with the server 150 and under control of program memory, such as the memory 180 associated with the processor 160. With regard to the unified network layer, this functionality is generally accomplished in preferred embodiments by the app execution subsystem 130 and the server 150.

A user that is successfully logged in may interact with the methods and systems described on a user device 120 and through a user interface 128. According to some embodiments, a user may be prompted to select a preferred action from a list of featured actions 331, 332, 333, 334. For purposes of illustration, and without limitation, a list of featured actions may include applying a product 331 such as a sunscreen or sunblock, scanning and comparing images 332 such as past and current images to assess aging, reviewing customer or profile history 333, and shopping for products 334. In some embodiments, the list of featured actions may include actions not listed above.

Figure 4B:
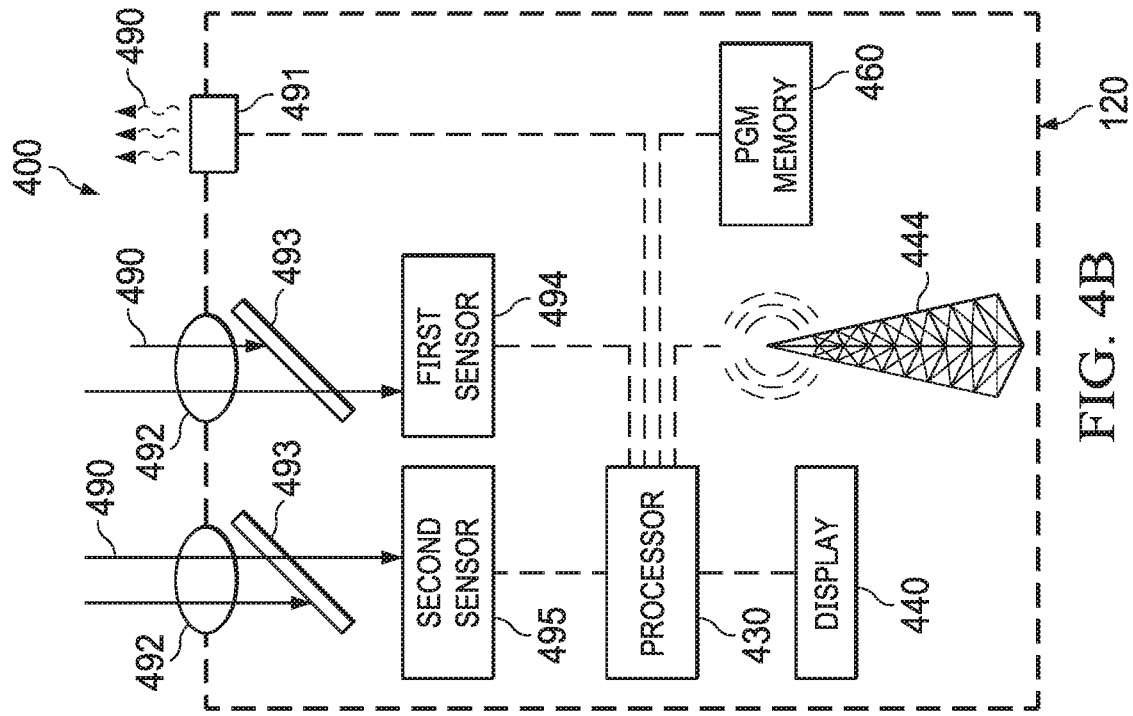
FIG. 4B shows a second embodiment of a hardware layer for a user device that has been modified to perform certain elements of a method for determining sunblock coverage and/or damage from ultraviolet radiation.
Figure 4A:
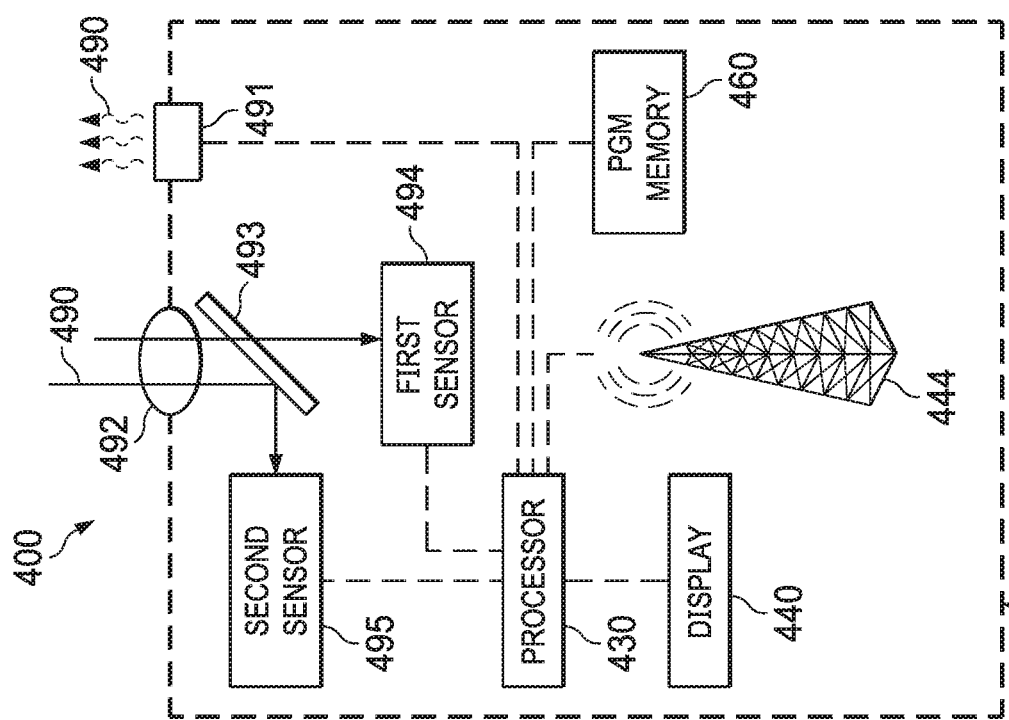
FIG. 4A shows a first embodiment of a hardware layer for a user device that has been modified to perform certain elements of a method for determining sunblock coverage and/or damage from ultraviolet radiation.

Referring now to FIG. 4A, some featured actions may require modifications to the hardware layer 400 of a user device 120. This is particularly necessary when a user device 120 is a personal mobile device or a smart mirror in accordance with described embodiments. While the embodiments of FIGS. 4A and 4B depict the components of the hardware layer 400 of the user device 120 as being housed in a single unit, it should be appreciated that the components depicted may be housed in any number of physically separable subsystems which may be communicatively coupled. For example, a visual display may be housed in a separate subsystem than the other components. Means of communicative coupling may include, without limitation, wireless, Bluetooth, USB, and/or Lightning connections. In some embodiments, a user device 120 may be modified to capture images in the UV spectrum (between 10 nm and 400 nm). Modifications necessary to capture images in the UV spectrum may include, without limitation, configuring a user device 120 to emit electromagnetic radiation in the UV spectrum (UV light) 490.

According to some embodiments, the UV and visible optics subsystem 124 may contain a light-emitting component 491 that emits UV light 490. The light-emitting component 491 may include LED components. In some embodiments, a single light-emitting component 491 may be utilized to emit both UV light 490 as well as visible light, i.e. electromagnetic radiation in the about 300 nm to 700 nm range. In other embodiments, different light-emitting components 491 may be used to emit (1) UV light 490, and (2) visible light. In yet other embodiments, multiple light-emitting components 491 may be used to emit any combination of (1) UV light 490, (2) visible light, (3) electromagnetic radiation with wavelengths smaller than 10 nm, and (4) electromagnetic radiation with wavelengths larger than 700 nm. In a specific embodiment, illustrated in FIG. 4A, a light-emitting component 491 is configured to emit electromagnetic radiation with wavelengths ranging from 10 nm to 700 nm.

Specifically with respect to UV emissions or "flash" from light-emitting component 491, the presently disclosed embodiments disclose that the UV light is of a wavelength and diffusion so as to avoid eye damage of the subject yet still provide a view of skin damage as described. For example, the UV light wavelength may be "UV-A," which is defined as from 315-400 nm. The app execution subsystem 130 accordingly controls the chosen wavelength of the image flash or continuous image illumination. In disclosed embodiments, the app execution subsystem 130 controls the wavelength of UV light emitted by the light-emitting component 491. For example, the app execution subsystem 130 can control the light-emitting component 491 to emit light in a wavelength from about 300 nm to about 800 nm, or from about 300 nm to about 400 nm, or from about 315 nm to about 400 nm, or from about 340 nm to about 360 nm, or from about 360 nm to about 390 nm, where about includes plus or minus 50 nm. In some embodiments, the app execution subsystem 130 controls the intensity of the UV light emitted from the light-emitting component 491. For example, the light-emitting component 491 of the user device 120 may emit UV light at an intensity of about 10 mW/cm$^2$ or lower. In some embodiments, the intensity is less than about 8 mW/cm$^2$, or less than about 6 mW/cm$^2$, or less than about 4 mW/cm$^2$, or less than about 2 mW/cm$^2$, or less than about 1 mW/cm$^2$, where about includes plus or minus 0.4 mW/cm$^2$. The intensity may be adjusted so that the UV light emitted by the light-emitting component 491 is comfortable for a human eye to receive.

A user device 120 may be configured to receive electromagnetic radiation through a light input 492 as a part of the UV and visible optics subsystem 124. Light input 492 may include any type of light input 492, including but not limited to, lenses, glass windows, plastic windows, double gauss light lenses, Cooke triplet light lenses, and aspheric light lenses. Further, light input 492 may be made of any material which may be known to a person of ordinary skill in the art, including but not limited to, glass, quartz glass, fluorite, plastics, or acrylics. In some embodiments, light input 492 may be configured to allow only visible light into the user device 120. In other embodiments, light input 492 may be configured to only allow UV light 490 into a user device 120. In yet other embodiments, light input 492 may be configured to selectively allow any combination of UV light 490, visible light, electromagnetic radiation with a wavelength smaller than 10 nm, and electromagnetic radiation with a wavelength larger than 700 nm, into a user device 120 while excluding or diminishing other wavelengths of electromagnetic radiation. In some embodiments, a user device 120 may include a single light input 492. Other embodiments, like the embodiment of FIG. 4B, may include multiple light inputs 492.

In some embodiments, a user device 120 may be configured to separate electromagnetic radiation by desired wavelength or wavelength ranges. For example, the UV and visible optics subsystem 124 may include one or more optical filters 493 to separate electromagnetic radiation (light) by wavelength or wavelength ranges. According to some embodiments, optical filter 493 may be placed external to a light input 492 of a user device 120. In other embodiments, optical filter 493 may be housed within the user device 120. In a specific embodiment, illustrated in FIG. 4A, an optical filter 493 may be a dichroic mirror which may be placed in such a manner that allows light received through a light input 492 of the user device 120 to strike the optical filter 493. In this embodiment, the optical filter 493 may reflect UV light 490 received at a light input 492 of a user device 120, while allowing other wavelengths of light to pass through. In another specific embodiment, illustrated in FIG. 4B, a user device 120 may be configured with more than one optical filters 493. According to this and other embodiments, each of the more than one optical filters 493 may be the same type of filter, e.g. dichroic, monochromatic, absorptive, etc., or may include any combination of optical filters 493. In the embodiment of FIG. 4B, the user device 120 may include two optical filters 493, each comprising a type of dichroic filter. One optical (dichroic) filter 493 may allow only light in the visible region of the electromagnetic spectrum to pass and the other optical (dichroic) filter 493 may allow only UV light 490 to pass.

Illustrated in FIGS. 4A and 4B, a hardware layer 400 and/or UV and visible optics subsystem 124 may further include one or more image sensors 494, 495. The image sensors may additionally be made up of one or more subsensors. For example, a single sensor may contain multiple subsensors, each capable of generating signals incident to specific wavelength ranges of received light. Subsensors may be housed in a single sensor or in multiple sensors. In some embodiments, the UV and visible optics subsystem 124 may include only a first sensor 494. In other embodiments, e.g. those shown in FIGS. 4A and 4B, the UV and visible optics subsystem 124 may include a first sensor 494 and a second sensor 495. In yet other embodiments, the UV and visible optics subsystem 124 may be configured with more than two image sensors. In some embodiments, one or more image sensors 494, 495 may include any combination of image sensors including but not limited to, semi-conductor charge coupled devices (CCDs), active pixel sensors, complementary metal oxide semi-conductors (CMOS), N-type metal oxide semiconductors (NMOS), live N-type metal oxide semiconductors (Live NMOS), Quantum Image Sensors (QIS), and any type of analog or digital sensor which may be capable of converting the variable attenuation of electromagnetic waves into signals. In some embodiments, a first image sensor 494 and a second image sensor 495 may be respectively tunable to detect electromagnetic radiation in a discreet range of wavelengths, e.g. 200-280 nm (UV-C), 280-315 nm (UV-B), 315-400 nm (UV-A), 390-700 nm, etc. In some embodiments, a first image sensor 494 and a second image sensor 495 may be configured to detect electromagnetic radiation in a large range of wavelengths, e.g. 10 nm-1000 nm, etc. In some embodiments, a first image sensor 494 and a second image sensor 495 may include a combination of the discreet-range and large-range sensor types disclosed above. Note also that there is an overlapping definition of what constitutes "visible" and "ultraviolet" light, with those wavelength spectra overlapping in the range of 300-400 nm. The presently described filters and spectra can be structured to flexibly allow for this overlap and still perform as taught by the disclosed embodiments. The present embodiments provide for the filtering, sensing, processing, and display of differing spectra, even if there may be some overlap of the spectra.

User device 120 may include a processor 430, a visual display 440, and a communications transmitter/receiver 444. According to come embodiments, a processor 430 may receive information from a first image sensor 494, a first image sensor 494 and a second image sensor 495, or any combination of a first image sensor 494, a second image sensor 495, and one or more additional image sensors. A processor 430 may be configured to convert information received from any combination of image sensors into an image. A processor 430 may be configured to display an image at a visual display 440 of a user device 120. Further, a processor 430 may be configured to transmit an image across a network through a communications transmitter/receiver 444. In some embodiments, user device 120 may be configured to transmit and receive information from a server.

In the embodiments of FIGS. 4A and 4B, system elements are illustrated as being integrated into a single user device 120, which may be a personal communication device. However, it should be appreciated that each of the described elements may be incorporated into a plurality of user devices 120, each capable of communicating with another. For example, according to some embodiments, the light-emitting component 491, light input 492, sensor(s) (e.g. first sensor 494, second sensor 495), and processor 430 may be housed in a UV illumination and imaging device 120 that may be communicatively coupled to a personal communication device 120 such as a smartphone. In these embodiments, the UV illumination and imaging device may emit UV light and/or visible light and capture images according to the methods described above. The UV illumination and imaging device may then transmit the images to the personal communication device where the images may be displayed on the device display 440 of the user interface 128. The second user device may be communicatively coupled with the first user device through the network 145 of FIG. 1 or through another means such as universal serial bus (USB), Bluetooth, or a Lightning connector or other type of communications connector or wireless link.

The architectures set forth in FIGS. 4A-4B show various sensors, processors, filters, displays, along with program memory 460 for storing running computer-readable code that can be run on the processor 430 in order to accomplish the methods described in the embodiments described in the present specification. It is envisioned that the functionality of the processor 430 could accomplish functionality of the image processing subsystem shown in FIG. 1, as well as the app execution subsystem 130 shown in FIG. 1, or that one or more processors could be provided in connection with program memory to perform those functionalities. Further, the sensors 494-495, filters 493, light inputs 492, and light sources 491 are envisioned to be comprised in the UV and visible optics subsystem 124 of FIG. 1, although certain capabilities provided by this circuitry could be considered to be "image processing," so the image processing subsystem 126 and UV and visible optics subsystem of FIG. 1 may be understood to have overlapping capabilities and circuits. The specific division of circuitry between the different subsystems of FIG. 1 are not intended to be limiting, and accordingly the scope of any patent claims that may later issue from this application, either directly or as a continuation or international filing, should be determined from the perspective of reviewing those patent claims in light of the specification.

Figure 5:
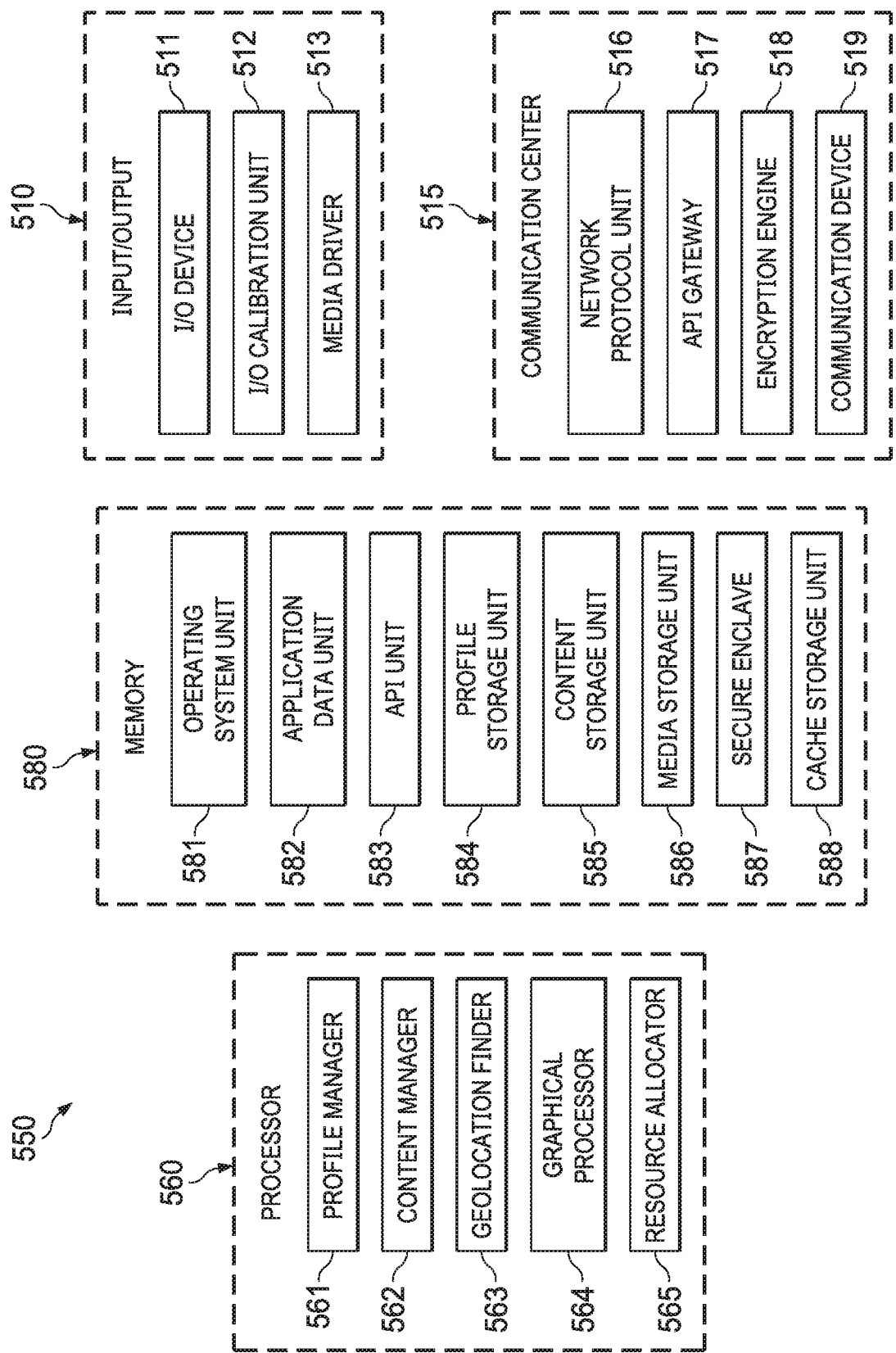
FIG. 5 shows a functional block diagram of a server for control and manipulation of images and data associated with disclosed systems and methods for determining sunblock coverage and/or damage from ultraviolet radiation.

As illustrated in FIG. 5, a server 550 may include, among other elements, any combination of a processor 560, a memory 580, an input/output (I/O) 510, and a communication center 515. As described in present embodiments, each of the processor 560, the memory 580, the I/O 510, and communication center 515 may include a plurality of respective units, subunits, and/or elements. Furthermore, each of the processor 560, the memory 580, the I/O 510, and the communication center 515 may be operatively or otherwise communicatively coupled with each other so as to facilitate the methods and techniques described herein.

The processor 560 may control any one or more of the memory 580, the I/O 510, the communication center 515, or any other unit which may include the server 550, as well as any included subunits, elements, components, devices, or functions performed by each or a combination of the memory 580, the I/O 510, the communication center 515 or any other unit which may include the server 550. Any of the elements or sub-elements of the server 550 presented here may also be included in a similar fashion in any of the other units, subunits, and devices included in the operating system 100 of FIG. 1. Additionally, any actions described herein as being performed by a processor 560 may be taken by the processor 560 alone, or by the processor 560 in conjunction with one or more additional processors, units, subunits, elements, components, devices, and the like. Additionally, while only one processor 560 may be shown in the figures included here, multiple processors may be present or otherwise included in the server 550 or elsewhere in the operating system of FIG. 1. Thus, while instructions may be described as being executed by the processor 560 or the various subunits of the processor 561, 562, 563, 564, 565, the instructions may be executed simultaneously, serially, or otherwise by one or more multiple processors 560.

In some embodiments, a processor 560 may be implemented as one or more computer processor (CPU) chips, graphical processor (GPU) chips, or some combination of CPU chips and GPU chips, and may include a hardware device capable of executing computer instructions. The processor 560 may execute any combination of instructions, codes, computer programs, and scripts. The instructions, codes, computer programs, and scripts may be received from, stored in, or received from and stored in any combination of the memory 580, the I/O 510, the communication center 515, subunits of the previously described elements, other devices, other computing environments.

In some embodiments, the processor 560 may include, among other elements, subunits. Subunits may include any combination of a profile manager 561, a content manager 562, a geolocation finder 563, a graphical processor 564, and a resource allocator 565. Each of these subunits of the processor 560 may be communicatively or otherwise operably coupled with each other.

The profile manager 561 may facilitate any combination of generation, modification, analysis, transmission, and presentation of a user profile associated with a user. For example, the profile manager 561 may prompt a user, through a user device 120, to register by inputting authentication credentials (illustrated in FIG. 2), personal identifying information, contact information, preferred buying habits, medical history, or any other information which may be associated with generating a personal profile for the user. The profile manager 561 may also control or utilize an element of the I/O 510 to enable a user to take a picture or video of themselves or another person. The profile manager 561 may receive, process, analyze, organize, transform, or any combination of these, any received from the user or another computing element as to generate a user profile of a user that may include any combination of personal information, contact information, user preferences, photos, videos, audio clips, a history of user activity, user preferences, user medical history, settings, and the like.

The content manager 562 may facilitate any combination of generation, modification, analysis, transmission, and presentation of media content associated with methods and systems for determining sunblock coverage and damage from ultraviolet radiation. For example, the content manager 562 may control the imaging environment of the application during the execution of various processes. For purposes of illustration and not limitation, media content for which the content manager 562 may be responsible may include any combination of advertisements, images, text, themes, audio files, video files, documents, and the like. In some embodiments, the content manager 562 may also interface with any combination of a third-party content server, memory location, and the database illustrated in FIG. 1.

The geolocation finder 563, particularly in communication with geolocation information provided by GPS subsystems 129 of user devices 120 (see FIG. 1) may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 563 may include any one or a combination of various sensors, specifically-purposed hardware elements for enabling the geolocation finder 563 to acquire, measure, and transform location information.

The graphical processor (GPU) 564 may facilitate any combination of generation, modification, analysis, processing, transmission, and presentation of visual content. In some embodiments, the GPU 564 may be configured to receive multiple images from a user and perform analysis on and/or modifications to the images. In some embodiments, analysis may include comparison of current images to past images in order to determine the progression of skin damage from ultraviolet radiation, quantifying skin damage from ultraviolet radiation based on data contained within the image, determining the quality of sunblock coverage from data contained within the image, etc. Further, the GPU 564 may be configured to facilitate adjustments to videos and images associated with a user. The GPU 564 may also be configured to render visual content for presentation on a user device 120 and/or to analyze visual content for metadata associated with a user or a user device. In some embodiments, this visual content may include a real-time image of a user as a user applies sunblock. The GPU 564 may include multiple GPUs and may therefore be configured to perform and/or execute multiple processes in parallel.

The resource allocator 565 may facilitate any one or combination of the determination, monitoring, analysis, and allocation of resources throughout the server 550, the system 100, any component of the system 100, or other computing environments. For example, the resource allocator 565 may facilitate interaction between the server 550, any subunit of the server 550, and a high volume (e.g. multiple) of users or associated user devices 120. As such, computing resources of the server 550 utilized by any one or a combination of the processor 561, the memory 580, the I/O 510, the communication center 515, and any subunit of these units, such as processing power, data storage space, network bandwidth, and the like may be in high demand at various times during operation. Accordingly, the resource allocator 565 may be configured to manage the allocation of various computing resources as they are required by particular units or particular subunits of the server 550.

In some embodiments, the resource allocator 565 may include sensors and/or other specially-purposed hardware for monitoring performance of each unit and/or subunit of the server 300, as well as hardware for responding to the computing resource needs of each unit or subunit. In some embodiments, the resource allocator 565 may utilize computing resources of a second computing environment separate and distinct from the server 550 to facilitate a desired operation.

In some embodiments, factors affecting the allocation of computing resources by the resource allocator 565 may include the number of ongoing user device connections and/or other communication channel connections, a duration during which computing resources are required by one or more elements of the server 550, and/or the like. In some embodiments, computing resources may be allocated to and/or distributed amongst a plurality of second computing environments included in the server 550 based on one or more factors mentioned above. In some embodiments, the allocation of computing resources of the resource allocator 565 may include one or more resource allocators 565 flipping a switch, adjusting processing power, adjusting memory size, partitioning a memory element, transmitting data, controlling one or more input and/or output devices, modifying various communication protocols, and the like. In some embodiments, the resource allocator 565 may facilitate utilization of parallel processing techniques such as dedicating a plurality of GPUs included in the processor 560 for processing high-quality analysis and manipulation of images and/or videos.

In some embodiments, the memory 580 may be utilized for one or any combination of storing, recalling, receiving, transmitting, and/or accessing various files and/or information during operation of the server 550. For example, the memory 580 may be utilized for storing images and/or videos associated with methods and systems for determining sunblock coverage and damage from ultraviolet radiation. The memory 580 may additionally be used for storing, recalling, and/or updating user profile information and the like. The memory 580 may include various types of data storage media such as solid state storage media, hard disk storage media, and any other type of data storage medium which may be known to a person of ordinary skill in the art. The memory 580 may include dedicated hardware elements such as hard drives and/or servers, as well as software elements such as cloud-based storage drives. For example, the memory unit 304 may include various subunits such as an operating system unit 581, an application data unit 582, an application programming interface (API) unit 583, a profile storage unit 584, a content storage unit 585, a video storage unit 586, a secure enclave 587, and/or a cache storage unit 588.

The memory 580 and any of its subunits described here may include any one or any combination of random access memory (RAM), read only memory (ROM), and various forms of secondary storage. RAM may be used to store volatile data and/or to store instructions that may be executed by the processor 560. For example, the data stored may be any one or a combination of a command, a current operating state of the server 550, an intended operating state of the server 550, and the like. As a further example, data stored in the memory 580 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 580 may include one or more databases for storing any data described here, e.g. the database 170 of FIG. 1. Additionally or alternatively, one or more secondary databases located remotely from the server 550 may be utilized and/or accessed by the memory 580.

The operating system unit 581 may facilitate deployment, storage, access, execution, and/or utilization of an operating system utilized by the server 550 and/or any other computing environment described herein. In some embodiments, the operating system may include various hardware and/or software elements that serve as a structural framework for enabling the processor 560 to execute various operations such as the analysis of images received from user devices 120, generation of targeted advertisements (sunblocks, sunscreens, other skin care products), controlling the user interface 128, etc. The operating system unit 581 may further store various pieces of information and/or data associated with operation of the operating system and/or the server 550 as a whole, such as a status of computing resources (e.g., processing power, memory availability, resource utilization, and/or the like), runtime information, modules to direct execution of operations described herein, user permissions, security credentials, and the like.

The application data unit 582 may facilitate deployment, storage, access, execution, and/or utilization of an application utilized by the server 550 or any other computing environment described herein (e.g., a user device 120). For example, users may be required to download, access, and/or otherwise utilize a software application on a user device 120 such as a smartphone or other internet-enabled device in order for various operations described herein to be performed. As such, the application data unit 582 may store any information and/or data associated with the application which may allow the application and/or user device 120 to perform methods associated with determining sunblock coverage and damage from ultraviolet radiation. As such, information included in the application data unit 582 may enable a user to execute various operations described here. The application data unit 582 may further store various pieces of information and/or data associated with operation of the application and/or the server 550 as a whole, such as a status of computing resources (e.g., processing power, memory availability, resource utilization, and/or the like), runtime information, modules to direct execution of operations described herein, user permissions, security credentials, and the like.

The application programming interface (API) unit 583 may facilitate deployment, storage, access, execution, and/or utilization of information associated with APIs of the server 550 and/or any other computing environment described herein (e.g., a user device). For example, server 550 may include one or more APIs for enabling various devices, applications, and/or computing environments to communicate with the server 550, multiple other servers, databases, or other user devices. Accordingly, the API unit 583 may include API databases containing information that may be accessed and/or utilized by applications and/or operating systems of other devices and/or computing environments associated with determining sunblock coverage and damage from ultraviolet radiation. An API may direct communications between the background component of the user device 120 and the server 550. In some embodiments, each API database may be associated with a customized physical circuit included in the memory unit 580 and/or the API unit 583. Additionally, each API database may be public and/or private, and so authentication credentials may be required to access information in an API database.

The profile storage unit 584 may facilitate deployment, storage, access, and/or utilization of information associated with user profiles of users by the server 550 and any other computing environment described here (e.g., a user device). For example, the profile storage unit 550 may store one or more of a user's contact information, authentication credentials, user preferences, user history of behavior, personal information, health history, and metadata. The profile storage unit 584 may store a user's images for analysis to determine skin damage from ultraviolet radiation, a user's shopping history for skincare products including sunblock, a user's location history as determined through the GPS subsystems 129 of the user device 120, etc. In some embodiments, the profile storage unit 584 may communicate with the profile management unit 561 to receive and/or transmit information associated with a user's profile.

The content storage unit 585 may facilitate deployment, storage, access, and/or utilization of information associated with requested content by the server 550 and/or any other computing environment described here (e.g., a user device 120 such as a mobile device). For example, the content storage unit 585 may store one or more of images, text, videos, audio content, advertisements, product lists (e.g. sunblocks and skincare products), user recommendations, and metadata to be presented to a user during operations described herein. In some embodiments, the content storage unit 585 may communicate with the content management unit 562 to receive and/or transmit content files.

The media storage unit 586 may facilitate one or more of deployment, storage, access, analysis, and utilization of media content by the server 550 and any other computing environment described herein (e.g., a user device). Media content may be images, videos, audio files, and any other form of communicative media. For example, the media storage unit 586 may store one or more UV images which may be uploaded from a user device. Further, the media storage unit 586 may store one or more images which have been manipulated by any unit or subunit of a server 550 or user device. For example, the media storage unit 586 may store UV images of skin damage from ultraviolet radiation. Media content generated or used in performing any of the methods disclosed here may be stored in the media storage unit 586 so that the media content may be analyzed by various components of the server 550 both in real time and at a time after receipt of the media content. In some embodiments, the media storage unit 586 may communicate with the GPUs 564 to facilitate any of the processes described here. In some embodiments, media content may include audio, images, text, video feeds, and/or any other media content associated with methods and systems for determining sunblock coverage and damage from ultraviolet radiation.

The secure enclave 587 may facilitate secure storage of data. In some embodiments, the secure enclave 587 may include a partitioned portion of storage media included in the memory unit 580 that is protected by various security measures. For example, the secure enclave 587 may be hardware secured. In other embodiments, the secure enclave 587 may include one or more firewalls, encryption mechanisms, and/or other security-based protocols. Authentication credentials of a user may be required prior to providing the user access to data stored within the secure enclave 587. In some embodiments, the secure enclave 587 may store sensitive user information such as medical history, credit card data, and/or data associated with the progression of skin damage from ultraviolet radiation.

The cache storage unit 588 may facilitate short-term deployment, storage, access, analysis, and/or utilization of data. In some embodiments, the cache storage unit 588 may serve as a short-term storage location for data so that the data stored in the cache storage unit 588 may be accessed quickly. In some embodiments, the cache storage unit 588 may include RAM and/or other storage media types that enable quick recall of stored data. The cache storage unit 588 may include a partitioned portion of storage media included in the memory 580. In some embodiments, the cache storage unit 588 may store data associated with popular sunblocks and/or skincare products, computational instructions for analysis of images to determine degree of skin damage, or other data which may be frequently used to promote products or to carry out methods of determining sunblock coverage and skin damage from ultraviolet radiation.

The I/O unit 510 may include hardware and/or software elements for enabling the server 550 to receive, transmit, and/or present information. For example, elements of the I/O unit 550 may be used to receive user input from a user via a user device 120, present manipulated UV images, manipulated visible light images, or manipulated video of a user applying sunblock or other skincare product, to the user via the user device 120, present suggested products to the user via a user device 120, and the like. In this manner, the I/O unit 510 may enable the server 550 to interface with a human user in a manner such that the user may use the methods described here. As described, the I/O unit 510 may include subunits such as any one or a combination of an I/O device 511, an I/O calibration unit 512, and/or video driver 513.

The I/O device 510 may facilitate any one or any combination of the receipt, transmission, processing, presentation, display, input, and output of information as a result of executed processes described here. In some embodiments, the I/O device 510 may include a plurality of I/O devices. In some embodiments, the I/O device 510 may include one or more elements of any one or a combination of a user device 120, a computing system, a server 550, and a similar device.

The I/O device 511 may include a variety of elements that enable a user to interface with the server 550. For example, the I/O device 511 may include a keyboard, a touchscreen, a button, a sensor, a biometric scanner, a laser, a microphone, a camera, an internet-enabled device, and/or another element for receiving and/or collecting input from a user. Additionally and/or alternatively, the I/O device 511 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 511 may communicate with one or more elements of the processor 560 and/or the memory unit 580 to execute operations described herein. For example, the I/O device 511 may include a display, which may utilize the GPU 564 to present media content stored in the media storage unit 586 to a user of a user device 120, including but not limited to previous UV images and/or videos.

The I/O calibration unit 512 may facilitate the calibration of the I/O device 511. For example, the I/O calibration unit 512 may detect and/or determine one or more settings of the I/O device 511, and then adjust and/or modify settings so that the I/O device 511 may operate more efficiently. For example, the I/O calibration unit may determine the strength of UV light emitted from a user device 120 in order to capture an adequate UV image needed for analysis. In some embodiments, the I/O calibration unit 512 may utilize a media driver 513 (or multiple media drivers) to calibrate the I/O device 511. The calibration unit 512 may also be operable to determine the ambient level of ultraviolet or other spectral lighting, so as to provide a baseline for later image comparisons. The media driver 513 may be installed on a user device 120 so that the user device 120 may recognize and/or integrate with the I/O device 5114, thereby enabling media content to be displayed, received, generated, and the like. In some embodiments, the I/O device 511 may be calibrated by the I/O calibration unit 512 by based on information included in the media driver 513.

The communication center 515 may facilitate establishment, maintenance, monitoring, and/or termination of communications between the server 550 and other devices such as user devices 120, other computing environments, third party server systems, and the like. The communication center 515 may further enable communication between various elements (e.g., units and/or subunits) of the server 550 as needed to determine sunblock coverage and skin damage from ultraviolet radiation. In some embodiments, the communication center 515 may include a network protocol unit 516, an API gateway 517, an encryption engine 518, and/or a communication device 519. The communication center 515 may include hardware and/or software elements.

The network protocol unit 516 may facilitate establishment, maintenance, and/or termination of a communication connection between the server 550 and another device (e.g. user device 120) by way of a network. For example, the network protocol unit 516 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, powerline communication (PLC) protocols, and the like. In some embodiments, facilitation of communication between the server 550 and any other device, as well as any element internal to the server 550, may include transforming and/or translating data from being compatible with a first communication protocol to being compatible with a second communication protocol. In some embodiments, the network protocol unit 516 may determine and/or monitor an amount of data traffic to consequently determine which particular network protocol is to be used for establishing a connection with a user device, transmitting data, and/or performing other operations described herein.

The API gateway 517 may facilitate the enablement of other devices and/or computing environments to access the API unit 583 of the memory 580 of the server 550. For example, a user device 120 may access the API unit 583 via the API gateway 517. In some embodiments, the API gateway 517 may be required to validate user credentials (e.g. login ID 225, password 226 of FIG. 2) associated with a user of a user device 120 prior to providing access to the API unit 583 to the user. The API gateway 517 may include instructions for enabling the server 550 to communicate with another device.

The encryption engine 518 may facilitate any one or any combination of translation, encryption, encoding, decryption, and decoding of information received, transmitted, and/or stored by the server 550. For example, the encryption engine 518 may encrypt data associated with a user's medical history, credit card information, analysis of skin damage from ultraviolet radiation, etc. Using the encryption engine, each transmission of data may be encrypted, encoded, and/or translated for security reasons, and any received data may be encrypted, encoded, and/or translated prior to its processing and/or storage. In some embodiments, the encryption engine 518 may generate any one or combination of an encryption key, an encoding key, a translation key, and the like, which may be transmitted along with any data content.

The communication device 519 may include a variety of hardware and/or software specifically purposed to enable communication between the server 550 and another device (e.g. user device 120), as well as communication between elements of the server 550. In some embodiments, the communication device 519 may include one or more radio transceivers, chips, analog front end (AFE) units, antennas, processors, memory, other logic, and/or other components to implement communication protocols (wired or wireless) and related functionality for facilitating communication between the server 550 and any other device. Additionally and/or alternatively, the communication device 519 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Referring now to FIG. 1, photographic systems and methods for determining skin exposure and damage from ultraviolet (UV) radiation 100 may involve, according to some embodiments, a user 101 using a user device 120 to capture images in the UV spectrum and communicating over a wireless network 145 with a server 150 to process, analyze, and store captured images. Various embodiments of the systems and methods are disclosed herein and it should be appreciated that any process described as being performed at a server 150, by a server 150, or any unit or subunit of a server 150 may be performed at the user device 120, at multiple or another user device 120 through a cloud 146, at a separate server 150, at multiple servers, or any combination of the user device 120, other user devices, the server 150, and multiple servers.

A user 101 may be required to install software on a user device 120 in order to perform the methods disclosed herein. Further, a user 101 may be required to register and provide information prior to performing the methods disclosed herein. In some embodiments, a user 101 may be required to provide information such as, but not limited to, name, address, ethnicity, hair color, skin tone, travel habits, family history, medical history, purchasing preferences, skin care regiments, etc., during or after registration. A user 101 may be required to provide a login ID and a password. In some embodiments, a user 101 may be provided with any one or a combination of a login ID and a password at registration. The information provided by a user 101 during registration may be stored at one or any combination of a memory 180 of a server, at a database 170 associated with a server 150, at other user devices assessable on the cloud 146, or at a user device 120.

Illustrated in FIG. 2, a system for determining skin exposure and damage from UV radiation may initiate at power up of a user device 120. In some embodiments, the system may initiate immediately on power up at action 221, while in other embodiments, a user may initiate the system at action 202 by selecting an icon 204 on a visual display of a user device 120. At initiation, a user device background component may start at action 222. In some embodiments, a background component may be loaded into the memory of the user device 120 and may initiate a foreground component. A foreground component may require that a user enter any one or a combination of a login ID 225 and a password 226. In these embodiments, the background component may connect to the server at action 223, provide the server with the login ID 225 and the password 226 and the server may authenticate the credentials of the user. At authentication of the credentials, a user may be considered to be successfully logged in. In other embodiments, a background component may connect to the server 223 independent of the user entering a login ID 225 or password 226. It should be appreciated that a user may store login ID 225 and/or password 226 in a manner that allows auto-population of these characters upon start up of the background component 222, allowing the background component to connect to the server 223 without action on the part of the user. Further, it should be appreciated that login ID 225 and password 226 may be substituted with any one or combination of authentication systems which may be readily known to a person of ordinary skill in the art, including without limitation, biometric data, geolocation data, and temporal data. Once a connection to the server is established, i.e. a user is successfully logged in, a server may retrieve information about a user 227 from a memory or a database associated with a server. Information retrieved may include, without limitation, any one or a combination of profile information, usage history, any information obtained during registration, any stored media associated with a user, user device, or user account, shopping history, and browsing history.

Referring now to FIG. 3, a user device 120 may use different layers in order to perform the functions and procedures disclosed herein. In some embodiments, a user device 120 may include a user interface layer 305, a multimedia processing layer 328, and a unified network layer 329. A user interface layer 305 may enable a user to use the system to perform any combination of functions and procedures described here. The user interface layer 305 may be configured to allow a user to interact by making selections and directing the system to perform functions. In some embodiments, a user interface layer 305 may provide a user that has successfully logged into the system to choose from one or more functions made capable on the system. The one or more functions may include, without limitation, any one or a combination of applying product 331, scanning and comparing 332, reviewing history 333, and shopping for products 334. Selection of a function 331, 332, 333, 334 may prompt the system to perform the functions described herein.

In some embodiments, a user may choose to apply a product 331 such as sunscreen or sunblock. In these embodiments, a system may provide a live-stream and/or real-time video to the user via the user device. In some embodiments, the video may include images compiled from data gathered in any one or a combination of the visible light spectrum and the UV light spectrum. In a specific embodiment, the video may provide the user with a real-time image of themselves as they apply a product, e.g. sunscreen, sunscreen alternative, etc. Referring now to FIGS. 4A and 4B, a user device 120 may be configured to emit UV light 490 via a light-emitting component 491. A processor 430 of a user device 120 may be configured to provide the light-emitting component 491 with the proper instructions on which type of light to emit, i.e. UV light, visible light, etc. In some embodiments, a user device 120 may be configured to detect the amount of ambient UV light in the surroundings. A processor 430 may be capable of directing the light-emitting component 491 of the user device 120 to emit a specific intensity of UV light 490 based on the intensity of ambient UV light in the surroundings. In some embodiments, this may include determining a baseline intensity of UV light based on, without limitation, sensors, camera images, geo-location data, etc. For example, the light-emitting component 491 of the user device 120 may emit UV light at an intensity of about 10 mW/cm$^2$ or lower. In some embodiments, the intensity is less than about 8 mW/cm$^2$, or less than about 6 mW/cm$^2$, or less than about 4 mW/cm$^2$, or less than about 2 mW/cm$^2$, or less than about 1 mW/cm$^2$, where about includes plus or minus 0.4 mW/cm$^2$.

A user device 120 may be configured to receive any one or a combination of UV light 490, visible light, and other wavelengths of electromagnetic radiation. In some embodiments, a user device 120 may receive generate display signals, operable to be received by a visual display, whereby the visual display may present both the first image and the second image.

Electromagnetic radiation through single light input 492, as depicted in FIG. 4A. In these embodiments, a user device 120 may be configured with one, two, or more than two image sensors 494, 495. Where a user device 120 is configured with more than one image sensor, the user device 120 may be additionally configured with a filter 493 to separate different wavelengths of electromagnetic radiation. In some embodiments, a filter 493 may be a dichroic mirror which is configured to separate UV light 490 from visible light and direct each at a respective image sensor 494, 495. According to some embodiments, a single image sensor 494 may be utilized at a user device 120. It should be appreciated that a filter 493 may be integrated with a light input 492 in a manner such that they are essentially a singular component of the user device 120.

A user device processor 430 may be configured to receive information from one or more image sensors 494, 495 and convert that information into an image. According to some embodiments, this may be performed by the multimedia processing layer 328 of the user device 120 of FIG. 3. Shown in FIG. 4A, a processor 430 may receive information from a first image sensor 494 and a second image sensor 495. Information received from a first image sensor 494 and a second image sensor 495 may be information relating to the intensity of light received in one or more of the UV spectrum, the visible spectrum, and other wavelengths of electromagnetic radiation. In some embodiments, information received from each of a first image sensor 494 and a second image sensor 495 may be processed independently to create an image. In these embodiments, an image is reconstructed based on the information received from the one or more sensors 494, 495 and may be displayed on a visual display 440 of a user device 120. An image may be manipulated by a processor 430 in any manner deemed appropriate in order to achieve a desired result. For example, an image may be manipulated by a processor 430 in a manner such that the contrast and/or definition are maximized for display. Depicted in FIG. 3, an image 306 may be displayed using the user interface layer 305 of the user device 120.

In some embodiments, images 306 may be displayed in a manner that creates a real-time video of a user as the user applies a product. In these embodiments, a product may be sunscreen or a sunscreen alternative which is capable of absorbing light in the UV spectrum. As is known in the art, sunscreen and sunscreen alternative products absorb light in the UV spectrum. In some embodiments presented herein, the user may utilize the video function of the system for determining the quality of their application of sunscreen or sunscreen alternative. In these embodiments, a user interface layer 305 (user interface 128) may present the user with a real-time video of themselves as they apply sunscreen or sunscreen alternative. In some embodiments, the user is presented with images derived from the intensity of UV light received by the user device 120 alone. In other embodiments, the user may be presented with images derived from the intensity of both UV light and visible light. In a specific embodiment, the user is presented with a real-time video of themselves applying sunscreen, the video being made up of images representing the overall UV light registered by the user device. In this embodiment, areas where sunscreen or sunscreen alternative is applied may appear darker due to the absorptive nature of sunscreen and sunscreen alternatives in the UV region of wavelengths. In these embodiments, a user may be able to determine both the quality of their application of the product as well as the effectiveness of the product with respect to the overall absorption of UV light.

Illustrated in FIG. 3, a user may choose to scan and compare 332. According to some embodiments, a user may capture an image using a user device 120 and UV light. Referring now to FIGS. 4A and 4B, a UV image may be captured by a user device 120. A flashlight component 491 of a user device 120 may be configured to emit UV light 490 alone or in conjunction with emitting light in the visible spectrum. Further, a user may capture a UV image without the use of a flashlight component 491, i.e. capturing UV images using the UV radiation occurring in natural sunlight. According to some embodiments, an image may be captured using the methods described herein and using the hardware layer of the user device 120 as depicted in FIGS. 4A and 4B or as described elsewhere in this disclosure.

Figure 6:
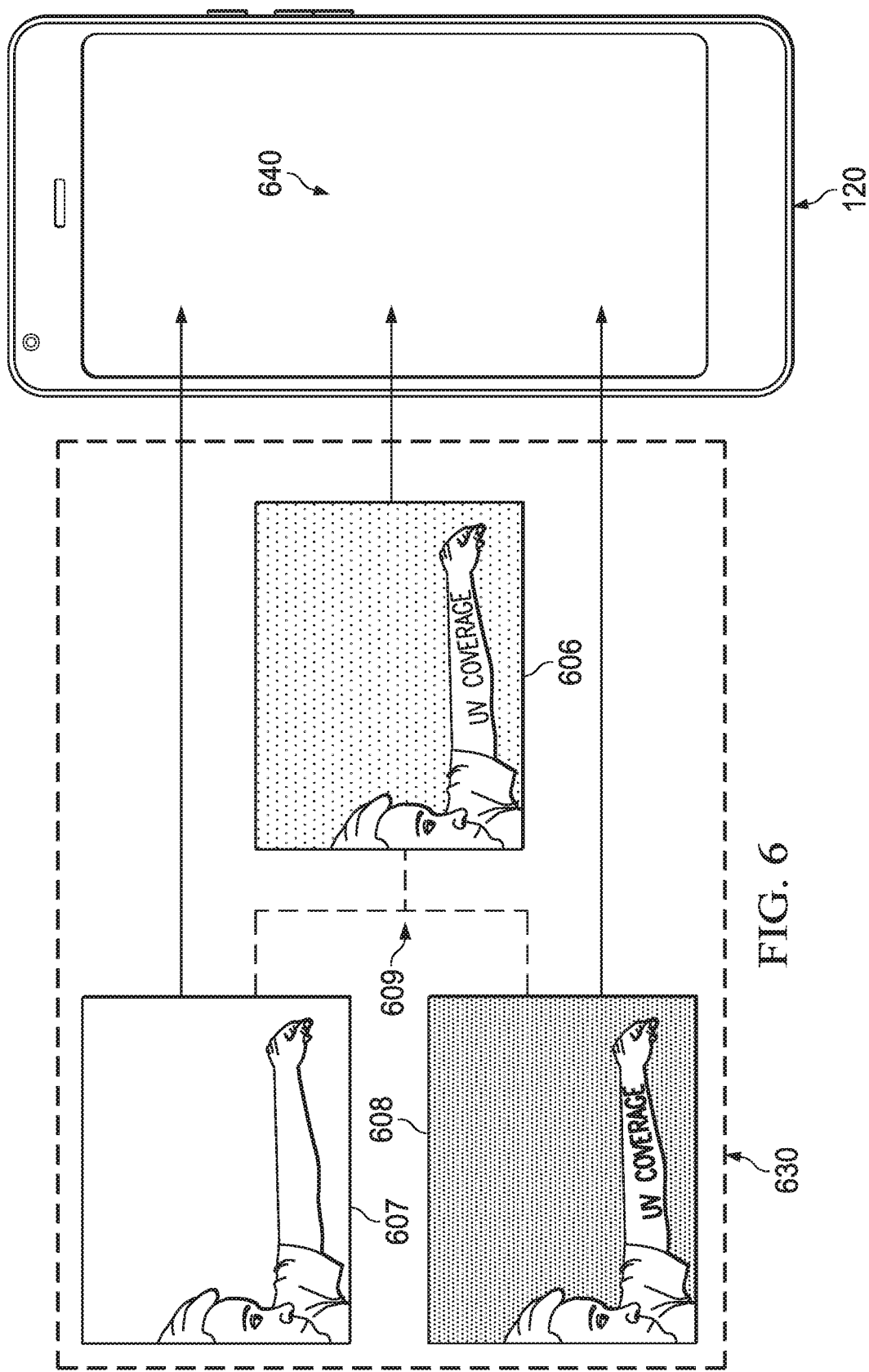
FIG. 6 shows an embodiment of a method of creating an image for determining sunblock coverage and/or damage from ultraviolet radiation.

Referring now to FIG. 6, a processor 630 may process 609 images captured at a user device 120. According to some embodiments, a processor 630 may reconstruct an image according to the intensity of light received at one or any combination of a first image sensor, a second image sensor, and a third or more image sensor. At least some of the intensity information received may relate to the intensity of light in the UV region of the electromagnetic spectrum. In some embodiments, a processor 630 may reconstruct a UV image 607 based solely on information received regarding the intensity of UV light. Further, a processor may reconstruct a visible light image 608 based on information received regarding the intensity of visible light. In some embodiments, a processor may process 609 information received regarding the intensity of both UV light and visible light into a merged image 606. Processing 609 may include, without limitation, any one or a combination of merging one or more images, enhancing characteristics (e.g. contrast, resolution, etc.) of one or more images, and reconstructing a single or multiple images using information about the UV spectrum and the visible spectrum.

According to some embodiments, a user may determine skin damage from UV radiation using the system and methods disclosed. In these embodiments, a user may be able to view a UV image 607 on a user device 120. In UV imaging, an area of skin that has experienced damage from UV light may appear darker than undamaged skin due to the absorptive nature of the damaged skin. Using embodiment systems and methods, a UV image 607 may reveal damaged skin areas to a user when the user views the UV image 607 on a user device 120. According to some embodiments, a user may view a merged image 606 on user device 120. In these embodiments, a processor 630 may process 609 information received about the intensity of UV light and visible light to create a merged image 606 that provides a contrasted UV picture 607 (black and white) merged with a full color visible light image 608. In these embodiments, skin damage due to UV light may appear as dark regions on an otherwise color image. In some embodiments, a user may be able to view both UV images 607 and visible light images 608 separately or individually on the same screen of the visual display 640.

Referring now to FIG. 3, a user may choose to review history 333. As shown in FIG. 5, a server 550 may store any one or a combination of user data, imaging, profile, historical and other data about a user at a memory 580 or database associated with the server 550. In some embodiments, the stored data may include images from previous user sessions. A processor 560 may be configured to analyze images. Analysis may include, without limitation, quantifying the intensity of UV radiation at a particular area of an image. In some embodiments, the intensity of UV radiation may be determined, without limitation, through any one or a combination of analysis of the brightness or darkness of the region, metadata associated with an image, and comparison of the brightness of a region to a baseline. The server 550 may be configured to provide analytical data to a user through a user device 120 by comparing stored images over time to quantify the extent of and/or change in sun damaged areas. Further, a server 550 may be configured to provide real-time analysis of images received from a user device 120 and provide quantifiable data about the intensity of UV radiation received at a particular region of an image. According to some embodiments, a server 550 may be configured to store user data, e.g. images, analysis results, etc., in a memory 580 or in a database associated with the server 550 in a manner in which it may be accessible by a health care provider or any other individual whom the user may designate as being able to access their information stored at a memory 580 or a database associated with the server 550. In some embodiments, a processor 560 may be configured to employ predictive technology in order to estimate how a region of sun damage may appear after a certain period of time, e.g. 5 years, 10 years, 15 years, 20 years, etc., if (1) no product is used, (2) if a specific product is used, and/or (3) a different product is used.

Referring now to FIG. 3, a user may choose to shop products 334. According to some embodiments, a user may be allowed to browse products using the user interface layer 305 of the user device 120. Illustrated in FIG. 5, a server 550 may be configured to provide a user with recommended product based on a variety of factors including, but not limited to, shopping and browsing history; results of image or video analyses; self-reported data from the user; geolocation data associated with a user device; travel habits; changes in images over time; types of persons allowed access to historical data; metadata associated with a user, a user device, or an image; medical history; user skin type; frequency and location of sun exposure; local weather data; and the like. It should be appreciated that a user may shop for products in a manner which allows a user to input search criteria, however this is not limiting. A server 550 may be configured to auto-generate a list of preferred products based on any criteria, including the aforementioned, and employ push advertising in order to recommend products to a user through a user device. For example, a server 550 may push-recommend a product to a user who is applying sunscreen that is determined to be ineffective by image analysis, or whose images indicate that an area of sun damage is increasing in intensity or size.

Figure 7A:
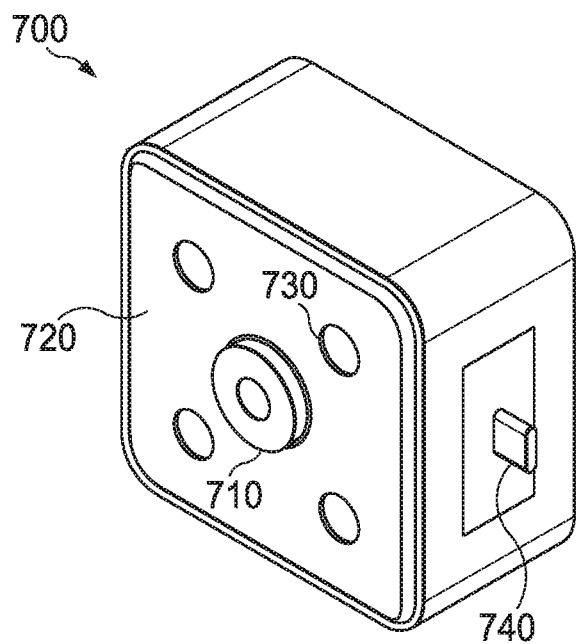
FIG. 7A shows a user device with four ultraviolet light-emitting components, a light input, and a dock connector.
Figure 7C:
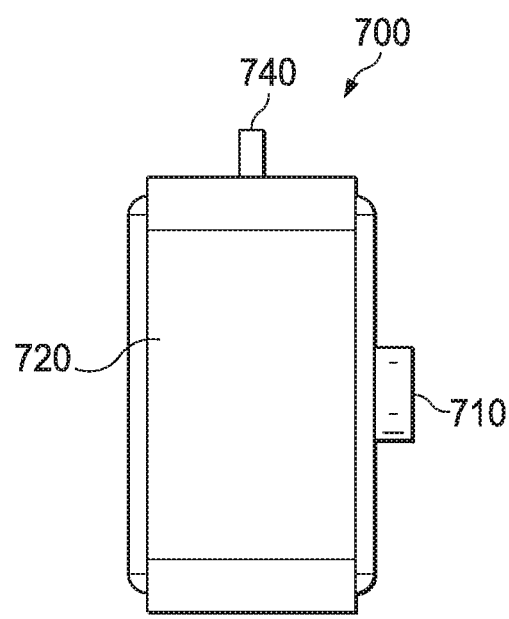
FIG. 7C shows a side view of the user device from FIGS. 7A and 7B showing the light input and the dock connector.
Figure 7B:
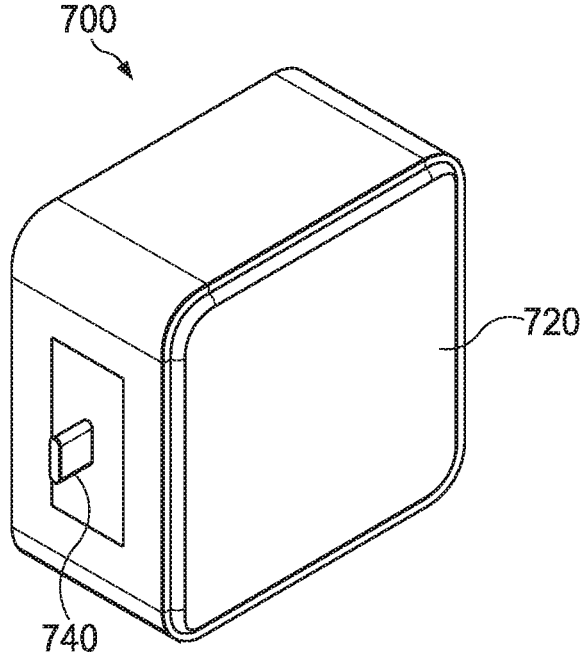
FIG. 7B shows a different perspective of the user device from FIG. 7A showing a back of the housing and the dock connector.

According to some embodiments, components of a disclosed device for determining sunblock coverage and damage from ultraviolet radiation may be housed in more than one unit. For example, a disclosed device includes a first user device containing a UV and visible optics subsystem and a second user device containing a user interface, an image processing subsystem, a GPS subsystem, and an app execution system. FIGS. 7A-7C show a user device 700 including a light input 710, a UV light source 730, and a dock connector 740. In some embodiments, the dock connector 740 connects the user device 700 to a second user device (not shown in FIGS. 7A-7C) having the user interface, the image processing subsystem, the GPS subsystem, and the app execution system. An advantage of having a separable user device 700 containing the UV and visible optics subsystem is that the user device 700 may be interchangeably coupled with any number of other user devices having complementary components such as phone, laptop, and tablet. Using a single user device 700 to obtain images also has the benefit of providing homogenous data even though the images may be processed on any number of user devices having the user interface and the image processing subsystem.

According to some embodiments, a disclosed user device 700 may be modified to capture images in the UV spectrum (between 10 nm and 400 nm). A UV light source 730 may emit electromagnetic radiation in the UV spectrum. The UV light source 730 includes LED components. Additionally, a user device 700 may include a light source capable of emitting visible light as well as electromagnetic radiation with wavelengths of less than 10 nm, greater than 700 nm, ranging from 10 nm to 700 nm, and combinations thereof. The UV light source 730 may emit electromagnetic radiation at various wavelengths and diffusions so as to avoid eye damage of the subject yet still provide a view of skin damage as described. For example, the UV light wavelength may be "UV-A," which is defined as from 315-400 nm.

In some embodiments, a disclosed user device 700 may be configured to receive electromagnetic radiation through a light input 710 as part of a UV and visible optics subsystem. The light input 710 may include any type of light input 710, including but not limited to, lenses, glass windows, plastic windows, double gauss light lenses, Cooke triplet light lenses, and aspheric light lenses. Further, light input 492 may be made of any material which may be known to a person of ordinary skill in the art, including but not limited to, glass, quartz glass, fluorite, plastics, or acrylics. The light input 710 may be configured to allow only visible light into the user device 700. In other embodiments, light input 710 may be configured to only allow UV light into a user device 700. In yet other embodiments, light input 710 may be configured to selectively allow any combination of UV light, visible light, electromagnetic radiation with a wavelength smaller than 10 nm, and electromagnetic radiation with a wavelength larger than 700 nm, into a user device 700 while excluding or diminishing other wavelengths of electromagnetic radiation. In some embodiments, a user device 700 may include a single light input 710 or multiple light inputs.

As shown in FIG. 7A, a user device 700 includes one or more UV light sources 730. For example, the user device 700 may include one UV light source 730, two UV light sources 730, three UV light sources 730, four UV light sources 730, five UV light sources 730, six UV light sources 730, seven UV light sources 730, eight UV light sources 730, nine UV light sources 730, or ten UV light sources 730. FIG. 7A shows a user device 700 having four UV light sources 730. Having four UV light sources 730 surrounding a light input 710 may desirably provide for an optimum UV light irradiation on a photographic subject so that adequate UV protective feedback is provided to a user. This configuration may prevent any surface of the photographic subject not being exposed to UV light radiation, which could improperly produce a false negative result. In some embodiments, the configuration disclosed in FIG. 7A may desirably irradiate a photographic subject with UV radiation, even if the subject was initially in the dark or not being exposed to any exogenous source of UV radiation. Disclosed four UV light source 730 configurations may synergistically work with the light input 710 to adequately irradiate and capture UV protective data in any lighting situation including in the dark, in the presence of sunlight, in the presence of additional light sources besides the sun, and combinations thereof. Additionally, a disclosed user device 700 may include more than one light input 710. For example, the user device 700 can have a first light input 710 on a face of the user device 700 while also having a second light input 720 on the opposite face of the user device 700. Having two light inputs 710 in this configuration may synergistically permit photography in more than one direction at either the same time or individually. Disclosed configurations such as this may permit a user to photograph themselves or others autonomously.

In some embodiments, a user device 700 may be configured to separate electromagnetic radiation by desired wavelength or wavelength ranges. For example, the UV and visible optics subsystem may include one or more optical filters to separate electromagnetic radiation (light) by wavelength or wavelength ranges. According to some embodiments, optical filter may be placed external to a light input 710 of a user device 700. In other embodiments, optical filter may be housed within the user device 700. In a specific embodiment, an optical filter may be a dichroic mirror which may be placed in such a manner that allows light received through a light input 710 of the user device 700 to strike the optical filter. In this embodiment, the optical filter may reflect UV light received at a light input 710 of a user device 700, while allowing other wavelengths of light to pass through. In another specific embodiment, a user device 700 may be configured with more than one optical filters. According to this and other embodiments, each of the more than one optical filters may be the same type of filter, e.g. dichroic, monochromatic, absorptive, etc., or may include any combination of optical filters. In the embodiments, the user device 700 may include two optical filters, each comprising a type of dichroic filter. One optical (dichroic) filter may allow only light in the visible region of the electromagnetic spectrum to pass and the other optical (dichroic) filter may allow only UV light to pass.

Disclosed user devices 700 can be configured to attach to any other user devices such as a personal electronic device through a dock connector 740. The dock connector 740 can carry a variety of signals and power through a single or multiple connectors to and from the user device 700 and any other user devices including a phone, laptop, and tablet. According to some embodiments, the user device 700 may not need to physically connect to another user device to communicate with it. For example, the user device 700 may communicate using any short-range (e.g., Bluetooth, Bluetooth Low Energy, near field communication, Wi-Fi Direct, etc.) or long-range communication mechanism (e.g., Wi-Fi, cellular, etc.).

A disclosed user device 700 includes a housing 720. The housing 720 is configured to house and support the components of the user device 700 including a UV light source 730, a light input 710, a dock connector 740, and any additional component needed to function. The housing 720 can be any shape, size, and color. In some embodiments, the housing 720 can be shaped to be physically compatible for attaching to another user device including any personal electronic device. For example, as shown in FIGS. 7A-7C, the housing 720 may be substantially cubic having a flat edge from which the dock connector 740 protrudes so that the housing 720 may desirably connect to another user device. Additionally, the orientation of the housing 720 may permit the user device 700 to securely rest and attach to another user device. The user device 700 includes a light input 710. The light input 710 includes, but is not limited to, lenses, glass windows, plastic windows, double gauss light lenses, Cooke triplet light lenses, and aspheric light lenses. The light input 710 can be placed in any position of the user device 700. For example, the light input 710 can be substantially in the center of a face of the user device 700, as shown in FIGS. 7A and 7C. In some embodiments, the light input 710 position as shown in FIGS. 7A and 7C may synergistically work with the four UV light sources 730 to fully capture UV protective data from a photographic subject.

FIGS. 8A and 8B show a configuration of how a user device 700 containing a light input 710 and a UV light source 730 may dock to another user device 750 containing a user interface 128, an image processing subsystem 126, a GPS subsystem 128, and an app execution system 130 through a dock connector 740 protruding from a housing 740 of the user device 700. As shown in FIGS. 8A and 8B, the user device 700 dock to another user device 750 so that a user may photograph themselves while monitoring the user interface 128 of user device 750. In some embodiments, the user device 700 can also be docked alternatively so that the light input 710 faces in any direction with respect to the user interface 128. For example, the light input 710 of the user device 700 can face about face with respect to the user interface 128 of the second user device 750 so that a user may photograph a subject in front of the user. In FIGS. 8A and 8B, the user device 700 attaches to the top of the second user device 750, but alternative configurations are permitted where the user device 700 attaches to any face of the second user device 750. In some embodiments, where a dock connector 740 is not needed for the user device 700 to communicate to the second user device 750, other attachment types are possible including a snap, clip, or any other connector known.

Both user device 700 and user device 750 may transmit images through a wireless network (not shown) to other user devices and/or analysis systems. For example, transmission of images may occur when user device 750 is a personal electronics device, or in other instances could be transferred through a wired network (not shown) or through a dock connector 740. A cloud network, such as the internet, can be used to further transmit a captured image to one or more servers, their associated memories, and processors for further storage and/or processing.

As shown in FIGS. 8A and 8B, a user device 750 includes an image processing subsystem 126 for professing images received and initially process by a user interface 700 and then communicated to user device 750. By the image capture and analysis, a user of the user device 750 can interact through a user interface 128, which may suggest preventative or curative measures relative to exposure to UV light, such as applying more sunblock or sunscreen or application of cosmetics or other treatments to mitigate the effects of extrinsic aging.

As used herein, the term "signal" may refer to a single signal or multiple signals. The term "signals" may refer to a single signal or multiple signals. Any reference to a signal may be a reference to an attribute of the signal.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems such as servers.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments.

While various embodiments in accordance with the disclosed principles have been described above, it should be understood that they have been presented by way of example only, and are not limiting. Furthermore, any reference in this disclosure to "invention" in the singular should not be used to argue that there is only a single point of novelty in this disclosure. Multiple inventions may be set forth herein.

What is claimed is:

1. A method for detecting UV imagery of a subject using a personal communication device and a connectable UV illumination and an imaging device, the method comprising:
   establishing a communication between the personal communication device and the UV illumination and imaging device, wherein the personal communication device comprises a user interface, an image processing subsystem, and an app execution system, and wherein the UV illumination and imaging device comprises a UV light source and a light input;

detecting the amount of ambient UV light in the surroundings of the subject;

depending on the detected amount of ambient UV light, sending UV illumination light from the UV illumination and imaging device to the subject;

capturing the UV imagery of the subject with the UV illumination and imaging device;

communicating the UV imagery from the UV illumination and imaging device to the personal communication device; and presenting the UV imagery on the user interface of the personal communication device, wherein the UV imagery displays UV reflectivity of the subject.

2. The method of claim 1, wherein establishing the communication between the personal communication device and the UV illumination and imaging device comprises inserting a dock connector of the UV illumination and imaging device into the personal communication device.

3. The method of claim 1, further comprising generating a comparison result by comparing the UV imagery to a stored UV image.

4. The method of claim 1, wherein the stored UV image comprises an image retrieved from one or more databases.

5. The method of claim 1, further comprising generating a predictive result of how a surface of the subject could appear after a period of time where no sunscreen is used on the surface of the subject.

6. The method of claim 1, further comprising generating a predictive result of how a surface of the subject could appear after a period of time where a sunscreen is used on the surface of the subject.

7. The method of claim 6, wherein the period of time comprises five years, ten years, fifteen years, and twenty years.

8. The method of claim 3, further comprising providing a recommendation based on the comparison result.

9. The method of claim 8, wherein the providing the recommendation comprises recommending at least one of a sunblock and a sunscreen to be applied to the subject.

10. The method of claim 1, wherein there are darker areas of the UV imagery of the subject where the subject has a relatively greater level of sunblock or sunscreen coverage compared to lighter areas of the UV imagery of the subject where the subject has a relatively lesser level of sunblock or sunscreen coverage.

11. The method of claim 1, wherein the UV illumination light from the UV illumination and imaging device is emitted at an intensity of about 10 $mW/cm^2$ or lower based upon the detected amount of UV ambient light.

12. The method of claim 1, wherein the UV illumination light from the UV illumination and imaging device is emitted at an intensity of about 8 mW/cm2 or lower based upon the detected amount of UV ambient light.

13. The method of claim 1, wherein the UV illumination light from the UV illumination and imaging device is emitted at an intensity of about 6 mW/cm2 or lower based upon the detected amount of UV ambient light.

14. The method of claim 1, wherein the UV illumination light from the UV illumination and imaging device is emitted at an intensity of about 4 mW/cm2 or lower based upon the detected amount of UV ambient light.

15. The method of claim 1, wherein the UV illumination light from the UV illumination and imaging device is emitted at an intensity of about 2 mW/cm2 or lower based upon the detected amount of UV ambient light.

16. The method of claim 1, wherein the UV illumination light from the UV illumination and imaging device is emitted at an intensity of about 1 mW/cm2 or lower based upon the detected amount of UV ambient light.

* * * * *